United States Patent [19]
Li et al.

[11] Patent Number: 6,103,781
[45] Date of Patent: Aug. 15, 2000

[54] LIQUID INKS USING A CONTROLLED CRYSTALLINITY ORGANOSOL

[75] Inventors: Wu-Shyong Li, Woodbury, Minn.; James A. Baker, Hudson, Wis.; Jai Venkatesan, Woodbury; Gay L. Herman, Cottage Grove, both of Minn.

[73] Assignee: 3M Innovative Properties Company, St. Paul, Minn.

[21] Appl. No.: 09/271,567

[22] Filed: Mar. 18, 1999

Related U.S. Application Data

[62] Division of application No. 08/721,081, Sep. 26, 1996, Pat. No. 5,886,067.

[51] Int. Cl.⁷ .............................. C08L 51/06; C08K 5/01; G03G 9/13
[52] U.S. Cl. .................... 523/201; 524/476; 524/577; 525/278; 525/309; 430/116
[58] Field of Search ............................. 523/201; 524/476, 524/577; 525/278, 309; 430/116

[56] References Cited

U.S. PATENT DOCUMENTS

| | | |
|---|---|---|
| 3,900,412 | 8/1975 | Kosel . |
| 3,967,962 | 7/1976 | O'Malley . |
| 4,665,002 | 5/1987 | Dan . |
| 4,818,657 | 4/1989 | Kondo . |
| 4,925,766 | 5/1990 | Elmasry . |
| 4,946,753 | 8/1990 | Elmsary . |
| 4,977,901 | 12/1990 | Ofstead . |
| 4,988,602 | 1/1991 | Jongewaard . |
| 5,006,441 | 4/1991 | Kato . |
| 5,073,471 | 12/1991 | Kato . |
| 5,156,911 | 10/1992 | Stewart . |

OTHER PUBLICATIONS

Jordon, E.F., D.W. Feldeisen and A.N. Writley, "Side–chain Crystallinity. I. Heats of Fusion and Melting Transitions on Selected Homopolymers Having Long Side Chains," *Journal of Polymer Science*, Part A–1,9, p. 1835 (1971).

Clark, R., A. Larson, E.E. Schmitt and S. P. Bitler, "Temperature Switchable Pressure Sensitive Adhesives," *Adhesives Age*, Sep., p. 39 (1993).

ASTM D 1146–88—Standard Test Method for Blocking Point of Potentially Adhesive Layers (Oct. 1988).

Wiley, R.H. and G.M. Brauer, "Refractometric Determination of Second–Order Transition Temperatures in Polymers. III. Acrylates and Methacrylates" *Journal of Polymer Science*, 3, No. 5 p. 647 (1948).

Greenberg, S.A. and T. Alfrey, "Side Chain Crystallization of n–Alkyl Polymethacrylates and Polyacrylates," *Journal of American Chemcial Society*, 76, p. 6280 (1954).

*Primary Examiner*—A. Merriam

[57] ABSTRACT

A liquid ink composition containing organosols having side-chain or main-chain crystallizable polymeric moieties is described. The incorporation of organosols having crystallizable polymeric moieties into the ink compositions provide improved blocking resistance and improved erasure resistance when used in ink transfer, ionographic, electrographic and electrophotographic color printing or proofing processes.

26 Claims, No Drawings

LIQUID INKS USING A CONTROLLED CRYSTALLINITY ORGANOSOL

This is a divisional of application Ser. No. 08/721,081 filed Sep. 26, 1996 now U.S. Pat. No. 5,886,067.

FIELD OF THE INVENTION

This invention relates to liquid ink compositions containing organosols having side-chain or main-chain crystallizable polymeric moieties. In particular, the present invention relates to ink compositions and liquid toners which exhibit improved blocking resistance and improved erasure resistance when used in ink transfer, ionographic, electrographic and electrophotographic color printing or proofing processes.

BACKGROUND

Liquid inks are widely used in a variety of printing processes, for example offset, intaglio, rotogravure, ink jet, electrographic and electrophotographic printing or proofing. Many of the desired characteristics of liquid inks are the same for each of the respective processes even though the final ink formulations may be substantially different. For example, in printing processes, it is desirable for the inks to remain in a free flowing liquid state during the ink deposition step, yet undergo rapid self-fixing shortly thereafter to produce durable, non-smearable, "prints" on a final receptor material. It is further understood that various rheological characteristics of the ink are known to affect its printing and transfer performance, e.g. ink "tack" and ink film modulus. The art continuously searches for novel methods to control and improve the Theological characteristics of liquid inks, particularly the rate of self-fixing, which in turn yields better print quality, efficiency and higher speed in the various printing processes.

In electrophotographic applications, which include devices such as photocopiers, laser printers, facsimile machines and the like, liquid inks are referred to as liquid toners or developers. Generally, the electrophotographic process includes the steps of forming a latent electrostatic image on a charged photoconductor by exposing the photoconductor to radiation in an imagewise pattern, developing the image by contacting the photoconductor with a liquid developer, and finally transferring the image to a receptor. The final transfer step may be performed either directly or indirectly through an intermediate transport member. The developed image is usually subjected to heat and/or pressure to permanently fuse the image to the receptor.

Liquid toners typically comprise an electrically insulating liquid which serves as a carrier for a dispersion of charged particles known as toner particles composed of a colorant and a polymeric binder. A charge control agent is often included as a component of the liquid developer to regulate the polarity and magnitude of the charge on the toner particles. Liquid toners can be categorized into two primary classes: for convenience, the two classes will be referred to as conventional liquid toners and organosol toners.

Of particular utility are the class of liquid toners which make use of self-stable organosols as polymeric binders to promote self-fixing of a developed latent image. U.S. Pat. Nos. 3,753,760; 3,900,412; 3,991,226; 4,476,210; 4,789,616; 4,728,983; 4,925,766; 4,946,753; 4,978,598 and 4,988,602 describe the composition and use of these types of organosols. Self-stable organosols are colloidal (0.1–1 micron diameter) particles of polymeric binder which are typically synthesized by nonaqueous dispersion polymerization in a low dielectric hydrocarbon solvent. These organosol particles are sterically-stabilized with respect to aggregation by the use of a physically-adsorbed or chemically-grafted soluble polymer. Details of the mechanism of such steric stabilization are provided in Napper, D. H., *Polymeric Stabilization of Colloidal Dispersions,* Academic Press, New York, N.Y., 1983. Procedures for effecting the synthesis of self-stable organosols are known to those skilled in the art and are described in *Dispersion Polymerization in Organic Media,* K. E. J. Barrett, ed., John Wiley: New York, N.Y., 1975.

The most commonly used non-aqueous dispersion polymerization method is a free radical polymerization carried out when one or more ethylenically-unsaturated (typically acrylic) monomers, soluble in a hydrocarbon medium, are polymerized in the presence of a preformed amphipathic polymer. The preformed amphipathic polymer, commonly referred to as the stabilizer, is comprised of two distinct repeat units, one essentially insoluble in the hydrocarbon medium, the other freely soluble. When the polymerization proceeds to a fractional conversion of monomer corresponding to a critical molecular weight, the solubility limit is exceeded and the polymer precipitates from solution, forming a core particle. The amphipathic polymer then either adsorbs onto or covalently bonds to the core, which core continues to grow as a discrete particle. The particles continue to grow until monomer is depleted; the attached amphipathic polymer "shell" acts to sterically-stabilize the growing core particles with respect to aggregation. The resulting core/shell polymer particles comprise a self-stable, nonaqueous colloidal dispersion (organosol) comprised of distinct spherical particles in the size (diameter) range 0.1–0.5 microns.

The resulting organosols can be subsequently converted to liquid toners by simple incorporation of the colorant (pigment) and charge director, followed by high shear homogenization, ball-milling, attritor milling, high energy bead (sand) milling or other means known in the art for effecting particle size reduction in a dispersion. The input of mechanical energy to the dispersion during milling breaks down aggregated pigment particles into primary particles (0.05–1.0 micron diameter) and "shreds" the organosol into fragments which adhere to the newly-created pigment surface, thereby acting to sterically-stabilize the pigment particles with respect to aggregation. A charge director may physically or chemically adsorb onto the pigment, the organosol or both. The result is a sterically-stabilized, charged, nonaqueous pigment dispersion in the size range 0.1–2.0 microns, with typical toner particle diameters between 0.1–0.5 microns. Such a sterically-stabilized dispersion is ideally suited for use in high resolution printing.

As with many printing inks, rapid self-fixing is a critical requirement for liquid toner performance to avoid printing defects (such as smearing or trailing-edge tailing) and incomplete transfer in high speed printing. A description of these types of defects and methods of preventing them using film forming compositions are described in U.S. Pat. Nos. 5,302,482; 5,061,583; and 4,925,766.

Another important consideration in formulating a liquid toner is the tack of the image on the final receptor. While toner tack is frequently an essential requirement for image transfer to the final receptor, it is desirable for the image on the final receptor material to be essentially tack free over a fairly wide range of temperatures. If the image has a residual tack, then the image may become embossed or picked off when placed in contact with another surface. This is especially a problem when printed sheets are placed in a stack.

If the image is tacky, it may transfer to the backside of the adjacent sheet. To address this concern, a film laminate or protective layer is typically placed over the surface of the image. This laminate often acts to increase the effective dot gain of the image, thereby interfering with the color rendition of the color composite. In color proofing applications, a change in the color rendition makes it more difficult to ascertain whether the contract proof matches the printed sheet. In addition, lamination of a protective layer on top of the final image surface adds both extra cost of materials and extra process steps to the printing or proofing process.

Various means have also been used to address this problem by, for example, employing radiation or catalytic curing methods to cure or crosslink the liquid toner after the development step in order to eliminate tack. Such curing processes are generally too slow for use in high speed printing processes. In addition, such curing methods can add significantly to the expense of the printing process. The curable liquid toners frequently exhibit poor shelf stability and may result in brittleness of the printed ink.

Jordan, E. F., et al., *Journal of Polymer Science*, Part A-1, 9, pp 1835–1852 (1971) (and references cited therein) report the heats of fusion and melting temperatures for selected (meth)acrylic homopolymers having n-alkyl monomer chain lengths between 12 and 22 carbon atoms which exhibit crystalline behavior. Jordan et al. note that polyacrylate homopolymers prepared using monomers with more than 13 carbon atoms in the main chain, and polymethacrylate homopolymers prepared using monomers having more than 17 carbon atoms in the main chain, exhibit crystalline melt transitions above room temperature (22° C.).

The introduction of these types of crystallizable side chains into waterbased pressure sensitive adhesives has been shown to control the tackiness of the adhesive. For example, emulsion polymers with side chain crystallinity have been used to achieve temperature switchable tack. Clarke, R., et al., "Temperature Switchable Pressure Sensitive Adhesives", *Adhesives Age*, pp 39–41 (1993) describes the use of side chain crystallizable polymers to modify the melting point range of an acrylic emulsion polymer pressure sensitive adhesive. The side chains were shown to be capable of crystallizing independently of the backbone which provided a crystalline to amorphous transition that was reversible. This reversible transition proved to be useful for the development of pressure sensitive medical tapes to reduce skin trauma. U.S. Pat. No. 5,156,911 also describes the use of side-chain crystallizable and main-chain crystallizable polymers to produce temperature-sensitive pressure sensitive adhesives for medical applications. Both disclosures are limited to modifications of emulsion polymer pressure sensitive adhesives.

Yet another important consideration in formulating a liquid toner relates to the durability and archivability of the image on the final receptor. The resistance of the image on the final receptor to removal by abrasion, particularly by abrasion from natural or synthetic rubber erasers commonly used to remove extraneous pencil or pen markings, is a desirable characteristic of liquid toners.

Currently, no one has sufficiently addressed the problem of obtaining rapid self-fixing liquid toners for use in high speed color printing or proofing processes which do not exhibit one or more of the deficiencies described above.

SUMMARY OF THE INVENTION

The present invention provides a liquid ink comprising a carrier liquid; an optional colorant and/or visual enhancement additive; and an organosol comprising a (co)polymeric steric stabilizer having a weight-average molecular weight greater than or equal to 5,000 Daltons and a polydispersity less than 15 covalently bonded to a thermoplastic (co) polymeric core that is insoluble in the carrier liquid. The organosol is characterized by having a weight ratio of the steric stabilizer to the thermoplastic core between 1/1 and 1/15. The steric stabilizer comprises a crystallizable polymeric moiety that is capable of independently and reversibly crystallizing at or above room temperature (22° C.). In some applications, notably those requiring rapid self-fixing of the ink, it may be advantageous for the thermoplastic core to have a glass transition temperature less than 22° C.

In one embodiment of the invention, an electrophotographic liquid toner is provided comprising a carrier liquid having a Kauri-butanol number less than 30; an optional colorant and/or visual enhancement additive; a charge director; and an organosol comprising a (co)polymeric steric stabilizer having a weight-average molecular weight between 5,000 and 1,000,000 Daltons and a polydispersity less than 15 covalently bonded to a thermoplastic (co) polymeric core that is insoluble in the carrier liquid and has a glass transition temperature less than 22° C. The organosol can be further characterized by having a weight ratio of the steric stabilizer to the thermoplastic core between 1/1 and 1/15. The steric stabilizer comprises a crystallizable polymeric moiety that is capable of independently and reversibly crystallizing at or above room temperature (22° C.). The crystallizable polymeric moiety may be incorporated into the main-chain of the steric stabilizer or as a side-chain.

In another embodiment of the invention, a process is provided using the electrophotographic liquid toner described above to form an image on a receptor. The process comprises the steps of: (a) providing a photoreceptive element having an electrostatic charge on the surface thereof; (b) exposing the surface with a radiation source to discharge portions of the surface to produce a latent image; (c) applying the electrophotographic liquid toner described above to the latent image on the surface of the photoreceptive element to form a toned image; (d) optionally transferring the toned image onto a transfer medium; and transferring the toned image to a final receptor. The final receptor includes coated or uncoated films and coated or uncoated paper.

In yet another embodiment of the invention, an electrostatic liquid toner is provided comprising a carrier liquid having a Kauri-butanol number less than 30; an optional colorant and/or a visual enhancement additive; a charge director; and an organosol comprising a (co)polymeric steric stabilizer having a weight-average molecular weight between 5,000 and 1,000,000 Daltons and a polydispersity less than 15 covalently bonded to a thermoplastic (co) polymeric core that is insoluble in the carrier liquid and has a glass transition temperature between 15° C. and 55° C. The organosol can be further characterized by having a weight ratio of the steric stabilizer to the thermoplastic core between 1/1 and 1/15. The steric stabilizer comprises a crystallizable polymeric moiety that is capable of independently and reversibly crystallizing at or above room temperature (22° C.). The crystallizable polymeric moiety may be incorporated into the main-chain of the steric stabilizer or as a side-chain. When a colorant or visual enhancement additive is included in the ink, the weight ratio of organosol to colorant or visual enhancement additive is preferably between 0.5/1 and 8/1.

Yet another embodiment of the invention provides a process using the electrostatic liquid toner described above to form an image on a receptor. The process comprises the steps of: (a) providing a dielectric element; (b) applying an electrostatic charge in an imagewise pattern on a surface of the dielectric element to produce a latent image; (c) applying the electrographic liquid toner described earlier to the latent image on the surface of the dielectric element to form a toned image, and optionally transferring the toned image to a receptor. The dielectric element may be the final receptor or the image may be transferred to a receptor different from the dielectric element.

The liquid inks or toners of the present invention will be described with respect to electrophotographic office printing; however, it is to be understood that these liquid toners are not limited in their utility and may also be employed in high speed printing presses, photocopying apparatus, microfilm reproduction devices, facsimile printing, ink jet printer, instrument recording devices, and the like.

DETAILED DESCRIPTION OF THE INVENTION

A liquid ink composition is provided comprising an organosol binder resin dispersed in a liquid or liquid blend and an optional colorant and/or visual enhancement additive. The liquid ink exhibits excellent erasure resistance, blocking resistance and temperature switchable tack characteristics by incorporating into the organosol a crystallizable polymeric moiety that is capable of independently and reversibly crystallizing at or above room temperature (22° C.). A rapidly self-fixing liquid ink is further provided which is particularly useful in electrophotographic, ionographic or electrostatic imaging and conventional printing or proofing processes.

As used herein, the term "(co)polymer" or "(co)polymeric" refers to homopolymers as well as polymers based on the polymerization of two or more monomeric compounds.

"Tack" refers to the tacky or sticky nature of the (co)polymeric composition or dried ink film. Tack can generally be determined by what is referred to as the thumb test in which the thumb is pressed against the surface being evaluated and then removed to determine the tacky or sticky nature of the surface. A substantially more accurate test is ASTM Test Method D2979, in which the tack values are grams of force required to remove the end of a stainless steel rod 5.0 mm in diameter from the surface of a coating at a speed of 10 mm per second to which it has been adhered for 1.0 second (contact speed 10 mm/sec). All tack results reported herein are determined at 22° C. and 50% relative humidity on films obtained by drying 25 g of organosol in a 3×4 inch rectangular aluminum weigh pan at 150° C. for 24 hours. After equilibration for 12 hours in a controlled temperature and humidity environment maintained at 22° C. and 50% relative humidity, the samples are mounted in a Polykem Probe Tack Tester and tack (reported as a force in grams) is measured at a probe withdrawal speed of 20 mm/sec after contacting the probe to the test film for 2.0 seconds. The higher probe speed and longer dwell time relative to ASTM Test Method D2979 was chosen in order to obtain measurable force readings on the Polykem Tack Tester, which was equipped with a lower sensitivity force transducer than specified in the ASTM Test Method. "Blocking" refers to the embossing or transfer of the image on the final receptor when placed in contact with another surface. Blocking is especially a problem when printed sheets are placed in a stack at temperatures above room temperature (22° C.). ASTM Test Method D1146-88 provides a means for assessing the blocking point of potentially adhesive layers. As used herein, "blocking" refers to second degree blocking as defined in ASTM Test Method D1146-88, i.e. "an adherence of such degree that when the surfaces under tests are parted one surface or the other will be found to be damaged." Furthermore, all blocking tests reported herein are to be interpreted as thermoplastic adhesive blocking tests as defined in the ASTM Test Method cited previously. The adhesive blocking tests are determined by superimposing three sheets of standard (1.5 inch square) paper on the adhesive face of a (1.5 inch square) conditioned imaged receptor, aligning the resulting test specimen on a glass plate such that the edges are flush, and placing a one pound weight on top of the aligned specimens in the center of the 1.5 inch square area. The above test assembly is placed in a desiccator at 38° C. for 24 hours, then cooled to room temperature prior to testing.

"Erasability" refers to the extent to which the toner image may be removed from the final receptor by rubbing or abrading with a natural or synthetic rubber eraser. Erasability may be determined by measuring the reduction in reflectance optical density for a solid developed image area on the final receptor after abrading for twenty passes in one direction with an eraser on a standard #2 pencil applied to the image using normal hand pressure. Image erasure resistance (IER), defined as 100×(reflectance optical density after twenty eraser passes)/(initial reflectance optical density), provides a convenient measure of image durability. An IER of 100% corresponds to maximum image durability; an IER of 0% corresponds to an image which is completely removed after twenty eraser passes.

"Hildebrand solubility parameter" refers to a solubility parameter represented by the square root of the cohesive energy density of a material, having units of (pressure)$^{1/2}$, and being equal to $(\Delta H-RT)^{1/2}/V^{1/2}$, where $\Delta H$ is the molar vaporization enthalpy of the material, R is the universal gas constant, T is the absolute temperature, and V is the molar volume of the solvent. Hildebrand solubility parameters are tabulated for solvents in: Barton, A. F. M., *Handbook of Solubility and Other Cohesion Parameters,* 2nd Ed. CRC Press, Boca Raton, Fla., (1991), for monomers and representative polymers in *Polymer Handbook,* 3rd Ed., J. Brandrup & E. H. Immergut, Eds. John Wiley, N.Y., pp 519–557 (1989), and for many commercially available polymers in Barton, A. F. M., *Handbook of Polymer-Liquid Interaction Parameters and Solubility Parameters,* CRC Press, Boca Raton, Fla., (1990).

"Crystallizable polymeric moiety" or "Polymerized crystalline compound" (PCC) refers to a polymeric moiety that is capable of independently and reversibly crystallizing at or above room temperature (22° C.).

The binder resin of the present invention is an amphipathic copolymer (also known as an organosol) composed of a high molecular weight (co)polymeric steric stabilizer covalently bonded to an insoluble, thermoplastic (co)polymeric core. The steric stabilizer includes a crystallizable polymeric moiety that is capable of independently and reversibly crystallizing at or above room temperature (22° C.).

Superior stability of the dispersed toner particles with respect to aggregation is obtained when at least one of the polymers or copolymers (denoted as the stabilizer) is an amphipathic substance containing at least one oligomeric or polymeric component having a weight-average molecular weight of at least 5,000 which is solvated by the carrier liquid. In other words, the selected stabilizer, if present as an independent molecule, would have some finite solubility in the carrier liquid. Generally, this requirement will be met if the absolute difference in Hildebrand solubility parameter between the steric stabilizer and the solvent is less than or equal to 3.0 MPa$^{1/2}$.

Table I lists Hildebrand solubility parameters for some common solvents used in an electrophotographic toner and the Hildebrand solubility parameters and glass transition temperatures (based on their high molecular weight homopolymers) for some common monomers used in synthesizing organosols.

TABLE I

Hildebrand Solubility Parameters
Solvent Values at 25° C.

| Solvent Name | Kauri-Butanol Number by ASTM Method D1133-54T (mL) | Hildebrand Solubility Parameter (MPa$^{½}$) |
|---|---|---|
| Norpar ™ 15 | 18 | 13.99 |
| Norpar ™ 13 | 22 | 14.24 |
| Norpar ™ 12 | 23 | 14.30 |
| Isopar ™ V | 25 | 14.42 |
| Isopar ™ G | 28 | 14.60 |
| Exxsol ™ D80 | 28 | 14.60 |

Source: Calculated from equation #31 of Polymer Handbook, 3rd Ed., J. Brandrup E. H. Immergut, Eds. John Wiley, NY, p. VII/522 (1989).

Monomer Values at 25° C.

| Monomer Name | Hildebrand Solubility Parameter (MPa$^{½}$) | Glass Transition Temperature (° C.)* |
|---|---|---|
| n-Octadecyl Methacrylate | 16.77 | −100 |
| n-Octadecyl Acrylate | 16.82 | −55 |
| Lauryl Methacrylate | 16.84 | −65 |
| Lauryl Acrylate | 16.95 | −30 |
| 2-Ethylhexyl Methacrylate | 16.97 | −10 |
| 2-Ethylhexyl Acrylate | 17.03 | −55 |
| n-Hexyl Methacrylate | 17.13 | −5 |
| t-Butyl Methacrylate | 17.16 | 107 |
| n-Butyl Methacrylate | 17.22 | 20 |
| n-Hexyl Acrylate | 17.30 | −60 |
| n-Butyl Acrylate | 17.45 | −55 |
| Ethyl Acrylate | 18.04 | −24 |
| Methyl Methacrylate | 18.17 | 105 |

Calculated using Small's Group Contribution Method, Small, P.A. Journal of Applied Chemistry 3 p. 71 (1953). Using Group Contributions from Polymer Handbook, 3rd Ed., J. Brandrup E. H. Immergut, Eds., John Wiley, NY, p. VII/525 (1989).
*Polymer Handbook, 3rd Ed., J. Brandrup E. H. Immergut, Eds., John Wiley, NY, pp. VII/209–277 (1989). The T$_g$ listed is for the homopolymer of the respective monomer.

The carrier liquid or solvent may be selected from a wide variety of materials which are known in the art, but should have a Kauri-butanol number less than 30 mL. The liquid is typically oleophilic, chemically stable under a variety of conditions, and electrically insulating. Electrically insulating refers to a dispersant liquid having a low dielectric constant and a high electrical resistivity. Preferably, the liquid dispersant has a dielectric constant of less than 5; more preferably less than 3. Electrical resistivities of carrier liquids are typically greater than 10$^9$ Ohm-cm; more preferably greater than 10$^{10}$ Ohm-cm. The liquid dispersant must also be relatively nonviscous to allow movement of the charged particles during development. The liquid must be sufficiently volatile to permit its removal from the final imaged substrate, but sufficiently non-volatile to minimize evaporative losses in the developer. In addition, the liquid dispersant must be chemically inert with respect to the materials or equipment used in the liquid electrophotographic process, particularly the photoreceptor and its release surface. Finally, the carrier liquid must be safe in terms of its physical (flammability), chemical, toxicological and environmental characteristics.

Examples of suitable liquid dispersants include aliphatic hydrocarbons (n-pentane, hexane, heptane and the like), cycloaliphatic hydrocarbons (cyclopentane, cyclohexane and the like), aromatic hydrocarbons (benzene, toluene, xylene and the like), halogenated hydrocarbon solvents (chlorinated alkanes, fluorinated alkanes, chlorofluorocarbons and the like) silicone oils and blends of these solvents. Preferred carrier liquids include branched paraffinic solvent blends such as Isopar™ G, Isopar™ H, Isopar™ K, Isopar™ L, Isopar™ M and Isopar™ V (available from Exxon Corporation, NJ), and most preferred carriers are the aliphatic hydrocarbon solvent blends such as Norpar™ 12, Norpar™ 13 and Norpar™ 15 (available from Exxon Corporation, NJ).

The steric stabilizer includes a polymerizable organic compound or mixture of polymerizable organic compounds of which at least one is a polymerizable crystallizable compound (PCC). Suitable PCC's include side-chain crystallizable and main-chain crystallizable polymerizable monomers, oligomers or polymers with melting transitions above room temperature (22° C.). Suitable PCC's include alkylacrylates where the alkyl chain contains more than 13 carbon atoms (e.g., tetradecylacrylate, pentadecylacrylate, hexadecylacrylate, heptadecylacrylate, octadecylacrylate, etc); alkylmethacrylates wherein the alkyl chain contains more than 17 carbon atoms. Other suitable PCCs with melting points above 22° C. include aryl acrylates and methacrylates; high molecular weight alpha olefins; linear or branched long chain alkyl vinyl ethers or vinyl esters; long chain alkyl isocyanates; unsaturated long chain polyesters, polysiloxanes and polysilanes; polymerizable natural waxes with melting points above 22° C., polymerizable synthetic waxes with melting points above 22° C., and other similar type materials known to those skilled in the art.

It will be understood by those skilled in the art that block resistance will be observed at temperatures above room temperature (22° C.) but below the crystallization temperature of the PCC. Improved blocking resistance is observed when the PCC is a major component of the graft stabilizer, preferably greater than 45% by weight of the graft stabilizer is the PCC, more preferably greater than or equal to 75%, most preferably greater than or equal to 90%. Suitable polymerizable organic compounds for use in the graft stabilizer composition in combination with the PCC include monomers such as, 2-ethylhexyl acrylate, lauryl acrylate, octadecyl acrylate, 2-ethylhexyl (methacrylate), lauryl methacrylate, hydroxy(ethylmethacrylate), octadecyl (methacrylate) and other acrylates and methacrylates. Other monomers, macromers or polymers may be used either alone or in conjunction with the aforementioned materials, including melamine and melamine formaldehyde resins, phenol formaldehyde resins, epoxy resins, polyester resins, styrene and styrene/acrylic copolymers, acrylic and methacrylic esters, cellulose acetate and cellulose acetate-butyrate copolymers, and poly(vinyl butyral) copolymers. Preferred weight-average molecular weights of the graft stabilizer are ≧5,000 Daltons (Da), more preferably ≧50,000 Da, most preferably 24 150,000 Da.

The polydispersity of the graft stabilizer also has an affect on imaging and transfer performance of the liquid toners. Generally, it is desirable to maintain the polydispersity (the ratio of the weight-average molecular weight to the number average molecular weight) of the graft stabilizer below 15, more preferably below 5, most preferably below 2.5.

Examples of polymerizable organic compounds suitable for use in the organosol core include monomers such as, methyl acrylate, ethyl acrylate, butyl acrylate, methyl (methacrylate), ethyl(methacrylate), butyl(methacrylate) and other acrylates and methacrylates, most preferred being methylmethacrylate and ethylacrylate. Other polymers which may be used either alone or in conjunction with the aforementioned materials, include melamine and melamine formaldehyde resins, phenol formaldehyde resins, epoxy resins, polyester resins, styrene and styrene/acrylic copolymers, vinyl acetate and vinyl acetate/acrylic copolymers, acrylic and methacrylic esters, cellulose acetate and cellulose acetate-butyrate copolymers, and poly(vinyl butyral) copolymers.

The optimal weight ratio of the resin core to the stabilizer shell is on the order of 1/1 to 15/1, preferably between 2/1 and 10/1, and most preferably between 4/1 and 8/1. Undesirable effects may accompany core/shell ratios selected outside of these ranges. For example, at high core/shell ratios (above 15), there may be insufficient graft stabilizer present to sterically-stabilize the organosol with respect to aggregation. At low core/shell ratios (below 1), the polymerization may have insufficient driving force to form a distinct particulate phase resulting in a copolymer solution, not a self-stable organosol dispersion.

The steric stabilizer may be chemically bonded to the resin core (i.e., grafted to the core) or may be adsorbed onto the core such that it remains as an integral part of the resin core. Any number of reactions known to those skilled in the art may be used to effect grafting of the soluble polymeric stabilizer to the organosol core during free radical polymerization. Common grafting methods include random grafting of polyfunctional free radicals; ring-opening polymerizations of cyclic ethers, esters, amides or acetals; epoxidations; reactions of hydroxyl or amino chain transfer agents with terminally-unsaturated end groups; esterification reactions (i.e., glycidyl methacrylate undergoes tertiary-amine catalyzed esterification with methacrylic acid); and condensation polymerization.

The grafting site may be formed by incorporating hydroxyl groups into the graft stabilizer during a first free radical polymerization and catalytically reacting all or a portion of these hydroxyl groups with an ethylenically unsaturated aliphatic isocyanate (e.g. meta-isopropenyldimethylbenzyl isocyanate [TMI] or isocyanatoethyl methacrylate [IEM]) to form a polyurethane linkage during a subsequent non-free radical reaction step. The graft stabilizer is then covalently bonded to the nascent insoluble acrylic (co)polymer core via reaction of the unsaturated vinyl group of the grafting site with ethylenically-unsaturated core monomers (e.g. vinyl esters, particularly acrylic and methacrylic esters with carbon numbers <7 or vinyl acetate; vinyl aromatics, such as styrene; acrylonitrile; n-vinyl pyrrolidone; vinyl chloride and vinylidene chloride) during a subsequent free radical polymerization step.

Other methods of effecting grafting of the preformed polymeric stabilizer to the incipient insoluble core particle are known to those skilled in the art. While not wishing to restrict ourselves to any particular grafting mechanism, non-limiting examples of alternative grafting mechanisms are exemplified in sections 3.7–3.8 of Barrett *Dispersion Polymerization in Organic Media,* K. E. J. Barrett, ed., (John Wiley: New York, 1975), pp. 79–106. A particularly useful method for grafting the polymeric stabilizer to the core utilizes an anchoring group. The function of the anchoring group is to provide a covalent link between the core part of the particle and the soluble component of the steric stabilizer. Suitable monomers containing anchoring groups include: adducts of alkenylazlactone comonomers with an unsaturated nucleophile containing hydroxy, amino, or mercaptan groups, such as 2-hydroxyethylmethacrylate, 3-hydroxypropylmethacrylate, 2-hydroxyethylacrylate, pentaerythritol triacrylate, 4-hydroxybutylvinylether, 9-octadecen-1-ol, cinnamyl alcohol, allyl mercaptan, methallylamine; and azlactones, such as 2-alkenyl-4,4-dialkylazlactone of the structure:

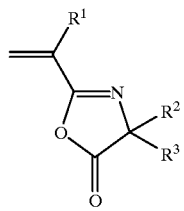

where, $R^1$=H, or alkyl having 1 to 5 carbons, preferably one carbon, $R^2$ and $R^3$ are independently lower alkyl groups having 1 to 8 carbons, preferably 1 to 4 carbons. Preferably the grafting mechanism is accomplished by grafting an ethylenically-unsaturated isocyanate (i.e., dimethyl-m-isopropenyl benzylisocyanate, available from CYTEC Industries) to hydroxyl groups previously incorporated into the graft stabilizer precursor (i.e., hydroxy ethyl methacrylate).

The insoluble core is the dispersed phase of the polymer dispersion. The core polymer is made in situ by copolymerization with the stabilizer monomer. For liquid electrophotographic toners, particularly liquid toners developed for use in offset transfer processes, the composition of the insoluble resin core is preferentially manipulated such that the organosol exhibits an effective glass transition temperature ($T_g$) of less than 22° C., more preferably less than 6° C. Controlling the glass transition temperature allows one to formulate an ink composition containing the resin as a major component to undergo rapid film formation (rapid self-fixing) in printing or imaging processes carried out at temperatures greater than the core $T_g$, preferably at or above 22° C. Rapid self-fixing assists in avoiding printing defects (such as smearing or trailing-edge tailing) and incomplete transfer in high speed printing. The use of low $T_g$ thermoplastic polymeric binders to promote film formation is described in Z. W. Wicks, *Film Formation,* Federation of Societies for Coatings Technologies, p 8 (1986).

The $T_g$ can be calculated for a (co)polymer using known values for the high molecular weight homopolymers (Table I) and the Fox equation expressed below:

$$1/T_g = w_1/T_{g1} + w_2/T_{g2} + w_3/T_{g3} + \ldots w_i/T_{gi}$$

where $w_i$ is the weight fraction of monomer "i" and $T_{gi}$ is the glass transition temperature of the high molecular weight homopolymer of monomer "i" as described in Wicks, A. W., F. N. Jones & S. P. Pappas, *Organic Coatings* 1, John Wiley, NY, pp 54–55 (1992).

According to this invention, it has been found that the overprinting capability of a toner is related to the ability of the latex polymer particles to deform and coalesce into a resinous film during the air drying cycle of the electrophoretically deposited toner particles. The coalescent particles permit the electrostatic latent image to discharge during the imaging cycle, so another image can be overprinted. On the other hand, non-coalescent particles of the prior art retain their shape even after being air dried on the photoreceptor. The points of contact are then few compared to a homogeneous or continuous film-forming latex, and as a result, some of the charges are retained on the unfused particles, repelling the next toner. Furthermore, a toner layer made of a latex having a core with a $T_g > 22°$ C. may be made to coalesce into a film at room temperature if the stabilizer/core ratio is high enough. Thus the choice of stabilizer/(core+stabilizer) ratios in the range 20 wt. % to 80 wt. % can give coalescence at room temperature with core $T_g$ values in a corresponding range 22° C. to 105° C. With a core $T_g < 22°$ C. the preferred range of stabilizer/(core +stabilizer) ratio is 10 to 40 wt. %.

Organosols with core $T_g$'s above room temperature (22° C.) typically do not form cohesive films resulting in poor image transfer in offset printing. The integrity of the toned image during partial removal of the solvent also depends upon the core $T_g$, with lower $T_g$, promoting film strength and image integrity at the cost of additional image tack. An organosol core $T_g$ below room temperature is preferred to ensure that the toner will in fact film form. Preferably, the minimum film forming temperatures are between about 22–45° C. and the organosol core $T_g$ is below room temperature to allow the toner to form a film and maintain good image integrity during solvent removal and good cohesive strength during image transfer from the photoconductor onto either a transfer medium or receptor.

It will be understood by those skilled in the art that the requirements imposed on the self-fixing characteristics of a liquid toner will depend to a great extent upon the nature of the imaging process. For example, rapid self-fixing of the toner to form a cohesive film may not be required or even desired if the image is not subsequently transferred to a final receptor. Thus in multi-color (i.e. multi-pass) electrostatic printing wherein a stylus is used to generate a latent electrostatic image directly upon a dielectric receptor which serves as the final toner receptor material, a rapidly self-fixing toner film may be undesirably removed in passing under the stylus. We have discovered that this phenomenon, known as head scraping, can be reduced or eliminated by manipulating the effective glass transition temperature of the organosol core. For liquid electrographic (electrostatic) toners, particularly liquid toners developed for use in direct electrostatic printing processes, the composition of the insoluble resin core is preferentially manipulated such that the organosol exhibits an effective glass transition temperature ($T_g$) of between 15–55° C., more preferably between 25–45° C.

The organosol core comprises approximately 30–95% of the organosol on a weight basis. Thus, the core's $T_g$ will typically dominate over the stabilizer's $T_g$ and the organosol $T_g$ may be taken as a first approximation to be the core $T_g$. A simple algebraic method based upon a composition-weighted sum of inverse $T_g$'s (absolute temperature) can be used to calculate the effective $T_g$ of a copolymer blend used to make-up an organosol core. Similar arguments allow an assumption that the solubility parameter of the stabilizer will generally control the stability of the organosol. Therefore, the stabilizer solubility parameter is preferably selected to closely match that of the liquid dispersant for maximum aggregation stability.

For inks containing organosols which are not comprised of polymerized PCC's, the best offset transfer efficiency without causing excessive residual tack and blocking of the transferred ink is obtained for an organosol core having a $T_g$ between −1° C. and 22° C., more preferably between −1° C. and 5° C. Under constant transfer roll pressure conditions; however, lower core $T_g$ organosols exhibit 100% transfer at lower temperatures than high $T_g$ organosols. In addition, lower $T_g$ organosols exhibit improved durability and greater resistance to abrasion and erasure (i.e. higher IER values). Thus, lower $T_g$ organosols would generally be preferred if residual image tack was not a consideration.

The results of toner transfer testing have been found to be dependent upon the extent of self-fixing or dryness of the toner film, which is approximately proportional to the difference between the ambient air temperature and the $T_g$ of the organosol core. Once again, lower $T_g$ organosols would generally be preferred for achieving the fastest rates of film formation (self-fixing) if residual image tack was not a consideration.

In addition, toned images will require some finite drying time to allow film formation to occur. This drying can be accelerated by using heated air, vacuum drying, an electrostatically-biased or unbiased squeegee (to hydraulically remove excess liquid dispersant) or other similar methods known in the art. For example, the system described in U.S. Pat. No. 5,300,990. The rate of film formation (self-fixing) may also be accelerated by adding a plasticizer to the toned image to effectively lower the minimum film forming temperature.

Residual image tack after transfer may be adversely affected by the presence of high tack monomers, such as ethyl acrylate, in the organosol. One method of addressing this problem is to limit the amount of high tack (low $T_g$) monomers present in the core such that the organosol core preferably has a glass transition temperature ($T_g$) less than room temperature (22° C.) but greater than 2° C. A preferred organosol core composition contains about 75 weight percent ethyl acrylate and 25 weight percent methyl methacrylate, yielding a calculated core $T_g$ of −1° C. This permits the toners to rapidly self-fix under normal room temperature or higher speed development conditions and also produce tack-free fused images which resist blocking. However, for some high speed printing applications, such high core $T_g$ values do not lead to self-fixing rates which are adequate to prevent smearing or distortion of the image either during image development or image transfer.

The solubility parameter of the core is chosen such that it differs from that of the dispersion medium in order to ensure that the core monomers will phase separate during dispersion polymerization (forming the core). The absolute difference in solubility parameters between the core and the solvent is preferably greater than 3.0 $MPa^{1/2}$. Conversely, the solubility parameter of the shell monomers is chosen to closely match that of the liquid dispersant in order to ensure that the stabilizer will be sufficiently solvated to dissolve in the dispersion medium. Therefore, both the solubility parameter and the glass transition temperature should be considered in selecting the monomers for use in synthesizing either the core or shell (graft stabilizer) of an organosol to achieve the desired results.

Using the data in Table 1 and applying the above criteria, it is noted that monomers and particularly blends of monomers such as methyl acrylate, ethyl acrylate, methyl methacrylate and ethyl methacrylate are most suitable for incorporation into an organosol core ($T_g$ covering a wide range between −24° C. to 105° C. and solubility parameter far removed from that of Norpar™ 12 having a Hildebrand solubility parameter equal to 14.6 $MPa^{1/2}$). Similarly, monomers such as octadecyl methacrylate, octadecyl acrylate and lauryl methacrylate are most suitable for incorporation into the graft stabilizer (organosol shell).

The particle size of the organosols also influences the imaging, drying and transfer characteristics of the liquid inks. Preferably, the primary particle size (determined with dynamic light scattering) of the organosol is between about 0.05 and 5.0 microns, more preferably between 0.15 and 1 micron, most preferably between 0.20 and 0.50 microns.

A transparent liquid ink may be prepared by dispersing the organosol in a suitable carrier liquid. The resulting pigment-free ink may be applied as a protective clear-coat on top of an image on a final receptor, thereby improving the block resistance and durability (abrasion and erasure resistance) of the underlying image even if the underlying image is tacky. Alternatively, the transparent liquid ink may be applied as a first ink layer on an intermediate receptor such as a photoreceptor. After subsequent deposition of one or more colored ink layers onto the first transparent ink layer, the resulting image may be transferred in registration to a final receptor, thus leaving the transparent first ink layer in position as a protective top-layer (clear coat) on the underlying image on a final receptor.

A liquid ink utilizing the aforementioned organosol preferably comprises colorant particles embedded in the thermoplastic organosol resin. Useful colorants are well known in the art and include materials such as dyes, stains, and pigments. Preferred colorants are pigments which may be incorporated into the polymer resin, are nominally insoluble in and nonreactive with the carrier liquid, and are useful and effective in making visible the latent electrostatic image. Examples of suitable colorants include: phthalocyanine blue (C.I. Pigment Blue 15:1, 15:2, 15:3 and 15:4), monoarylide yellow (C.I. Pigment Yellow 1, 3, 65, 73 and 74), diarylide yellow (C.I. Pigment Yellow 12, 13, 14, 17 and 83), arylamide (Hansa) yellow (C.I. Pigment Yellow 10, 97, 105 and 111), azo red (C.I. Pigment Red 3, 17, 22, 23, 38, 48:1, 48:2, 52:1, 81 and 179), quinacridone magenta (C.I. Pigment Red 122, 202 and 209) and black pigments such as finely divided carbon (Cabot Monarch 120, Cabot Regal 300R, Cabot Regal 350R, Vulcan X72) and the like.

Visual enhancement additives, such as fluorescent materials, pearlescent materials, iridescent materials, metallic materials, flip-flop pigments, silica, polymeric beads, reflective and non-reflective glass beads, and mica may also be added in place of a colorant to provide a visually enhanced image. The visual enhancement additives may be used either alone or in combination with the above pigments to produce images with the desired visual effects.

An optimal weight ratio of resin to colorant in the toner particles is from 1/1 to 20/1, preferably from 3/1 to 10/1 and most preferably from 4/1 to 8/1. The total dispersed material in the carrier liquid typically represents 0.5 to 70 weight percent, preferably from 1 to 25 weight percent, most preferably from 2 to 14 weight percent of the total liquid developer composition.

Other additives may also be added to the dispersion, such as UV stabilizers, mold inhibitors, bactericides, fungicides, and other materials known in the art which enhance weatherability.

It will be understood by those skilled in the art that the requirements imposed on the imaging characteristics of a liquid toner will depend to a great extent upon the nature of the imaging process. For example, in multi-color (i.e. multipass) electrostatic printing wherein a stylus is used to generate a latent electrostatic image directly upon a dielectric receptor material, followed by development of liquid toner to product the final image directly on the final (dielectric) receptor, a rapidly self-fixing toner film may be undesirably removed in passing under the stylus.

For liquid electrographic (electrostatic) toners, particularly liquid toners developed for use in direct electrostatic printing processes, the composition of the insoluble resin core is preferentially manipulated such that the organosol exhibits an effective glass transition temperature ($T_g$) of between 15–55° C., more preferably between 25–45° C. Such toners will not undergo rapid self-fixing in printing or imaging processes carried out at room temperature. Consequently, such toners commonly exhibit printing defects (such as smearing or bleeding of the toner into non-imaged areas. We have discovered that such imaging defects, in particular bleeding or smearing of the toner into background areas of the image, may be reduced by using weight ratios of resin to colorant in the toner particles from 0.5/1 to 3/1 more preferably from 1/1 to 2/1.

It will be further understood by those skilled in the art that the use of PCC's in an organosol used to fabricate an electrostatic toner as described above is not necessary to reduce residual image tack and hence image blocking, since organosol cores exhibiting glass transition temperatures above room temperature are generally tack free. However, the use of a PCC in the organosol stabilizer will still act to improve the durability, abrasion resistance and erasure resistance of the resulting image.

The organosols of the present invention have been used to fabricate liquid electrophotographic toners which exhibit excellent imaging characteristics in liquid immersion development. Color liquid toners made according to this invention on development form substantially transparent films which transmit incident light at selected wavelengths (preferably >700 nm, more preferably >780 nm), consequently allowing the photoconductor layer to discharge, while non-coalescent particles scatter a portion of the incident light. Non-coalesced toner particles therefore result in the decreasing of the sensitivity of the photoconductor to subsequent exposures and consequently there is interference with the overprinted image. This also permits latent image generation by Infrared laser scanning devices.

The electrophotographic toners of the present invention have low $T_g$ values with respect to most available toner materials. This enables the toners of the present invention to form films at room temperature. It is not necessary for any specific drying procedures or heating elements to be present in the apparatus. Normal room temperature (19–20° C.) is sufficient to enable film forming and of course the ambient internal temperatures of the apparatus during operation which tends to be at a higher temperature (e.g., 22–40° C.) even without specific heating elements is sufficient to cause the toner or allow the toner to form a film. It is therefore possible to have the apparatus operate at an internal temperature of 40° C. or less at the toning station and immediately thereafter where a fusing operation would ordinarily be located.

The organosol liquid toners of the present invention also exhibit improved transfer characteristics relative to conventional inks used in the art, particularly with offset transfer processes. The rapid-fixing characteristics of the toners permit their use in liquid development/dry adhesive offset transfer imaging processes, such as the process described in co-pending U.S. patent application Kellie, et al. titled "Method and Apparatus having Improved Image Transfer Characteristics for Producing an Image on Plain Paper" filed on Sep. 29, 1995 (Ser. No. 08/536,687). Dry adhesive transfer eliminates the need for coronas or other charging devices to electrostatically assist transfer of a wet image from the imaging surface to the preferred substrate. In addition, dry adhesive transfer of the toner further reduces carry-out of excessive solvent vapors with the image, as would occur with conventional electrostatically-assisted transfer processes. An electrophotographic liquid toner may be formulated by incorporating a charge control agent into the liquid ink. The charge control agent, also known as a charge director, provides uniform charge polarity of the toner particles. The charge director may be incorporated into the toner particles using a variety of methods such as, chemically reacting the charge director with the toner particle, chemically or physically adsorbing the charge director onto the toner particle (resin or pigment), or chelating the charge director to a functional group incorporated into the toner particle. A preferred method is via a functional group built into the graft stabilizer. The charge director acts to impart an electrical charge of selected polarity onto the toner particles. Any number of charge directors described in the art may be used. For example, the charge director may be introduced in the form of metal salts consisting of polyvalent metal ions and organic anions as the counterion. Suitable metal ions include Ba(II), Ca(II), Mn(II), Zn(II), Zr(IV), Cu(II), Al(III), Cr(III), Fe(II), Fe(III), Sb(III), Bi(III), Co(II), La(III), Pb(II), Mg(II), Mo(III), Ni(II), Ag(I), Sr(II), Sn(IV), V(V), Y(III), and Ti(IV). Suitable organic anions include carboxylates or sulfonates derived from aliphatic or aromatic carboxylic or sulfonic acids, preferably aliphatic fatty acids such as stearic acid, behenic acid, neodecanoic acid, diisopropylsalicylic acid, octanoic acid, abietic acid, naphthenic acid, octanoic acid, lauric acid, tallic acid, and the like. Preferred positive charge directors are the metallic carboxylates (soaps) described in U.S. Pat. No. 3,411,936, incorporated herein by reference, which include alkaline earth- and heavy-metallic salts of fatty acids containing at least 6–7 carbons and cyclic aliphatic acids including naphthenic acid; more preferred are polyvalent metal soaps of zirconium and aluminum; most preferred is the zirconium soap of octanoic acid (Zirconium 1HEX-CEM from Mooney Chemicals, Cleveland, Ohio).

The preferred charge direction levels for a given toner formulation will depend upon a number of factors, including the composition of the graft stabilizer and organosol, the molecular weight of the organosol, the particle size of the organosol, the core/shell ratio of the graft stabilizer, the pigment used in making the toner, and the ratio of organosol to pigment. In addition, preferred charge direction levels will also depend upon the nature of the electrophotographic imaging process, particularly the design of the developing hardware and photoreceptive element. Those skilled in the art, however, know how to adjust the level of charge direction based on the listed parameters to achieve the desired results for their particular application.

The conductivity of a liquid toner has been well established in the art as a measure of the effectiveness of a toner in developing electrophotographic images. A range of values from $1.0 \times 10^{-11}$ mho/cm to $10.033 \ 10^{-11}$ mho/cm has been disclosed as advantageous in U.S. Pat. No. 3,890,240. High conductivities generally indicate inefficient association of the charges on the toner particles and is seen in the low relationship between current density and toner deposited during development. Low conductivities indicate little or no charging of the toner particles and lead to very low development rates. The use of charge director compounds to ensure sufficient charge associated with each particle is a common practice.

Any number of methods may be used for effecting particle size reduction of the pigment in preparation of the gel liquid toners. Some suitable methods include high shear homogenization, ball-milling, attritor milling, high energy bead(sand) milling or other means known in the art.

In electrophotographic and electrographic processes, an electrostatic image is formed on the surface of a photoreceptive element or dielectric element, respectively. The photoreceptive element or dielectric element may be an intermediate transfer drum or belt or the substrate for the final toned image itself, as described by Schmidt, S. P. and Larson, J. R. in *Handbook of Imaging Materials* Diamond, A. S., Ed: Marcel Dekker: New York; Chapter 6, pp 227–252, and U.S. Pat. Nos. 4,728,983, 4,321,404, and 4,268,598.

In electrography, a latent image is typically formed by (1) placing a charge image onto the dielectric element (typically the receiving substrate) in selected areas of the element with an electrostatic writing stylus or its equivalent to form a charge image, (2) applying toner to the charge image, and (3) fixing the toned image. An example of this type of process is described in U.S. Pat. No. 5,262,259.

Images formed by the present invention may be of a single color or a plurality of colors. Multicolor images can be prepared by repetition of the charging and toner application steps. Examples of electrophotographic methods suitable for producing full color reproductions are described by U.S. Pat. Nos. 2,297,691; 2,752,833; 2,986,466; 3,690,756; 4,403,848; 4,370,047; 4,467,334; 4,728,983; 5,420,675; co-pending U.S. patent application Kellie, et al. titled "Method and Apparatus for Producing a Multi-colored Image in an Electrophotographic System" filed on Sep. 29, 1995 (Ser. No. 08/537,296); and European Patent Application No. 0,453,256. Examples of suitable transfer and fixing processes are described in U.S. Pat. Nos. 4,337,303; 5,108,865 and 5,204,722.

In electrophotography, the electrostatic image is typically formed on a drum or belt coated with a photoreceptive element by (1) uniformly charging the photoreceptive element with an applied voltage, (2) exposing and discharging portions of the photoreceptive element with a radiation source to form a latent image, (3) applying a toner to the latent image to form a toned image, and (4) transferring the toned image through one or more steps to a final receptor sheet. In some applications, it is sometimes desirable to fix the toned image using a heated pressure roller or other fixing methods known in the art.

While the electrostatic charge of either the toner particles or photoreceptive element may be either positive or negative, electrophotography as employed in the present invention is preferably carried out by dissipating charge on a positively charged photoreceptive element. A positively-charged toner is then applied to the regions in which the positive charge was dissipated using a liquid toner immersion development technique. This development may be accomplished by using a uniform electric field produced by a development electrode spaced near the photoreceptive element surface. A bias voltage is applied to the electrode intermediate to the initially charged surface voltage and the exposed surface voltage level. The voltage is adjusted to obtain the required maximum density level and tone reproduction scale for halftone dots without any background deposited. Liquid toner is then caused to flow between the electrode and the photoreceptive element. The charged toner particles are mobile in the field and are attracted to the discharged areas on the photoreceptive element while being repelled from the undischarged non-image areas. Excess liquid toner remaining on the photoreceptive element is removed by techniques well known in the art, such as those described in U.S. Pat. No. 5,300,990. Thereafter, the photoreceptive element surface may be force dried or allowed to dry at ambient conditions.

A particularly useful electrophotographic process for forming a multi-colored image on a receptor is described in co-pending U.S. patent application Kellie, et al. titled "Method and Apparatus for Producing a Multi-colored Image in an Electrophotographic System" filed on Sep. 29, 1995 (Ser. No. 08/537,296). Basically, this process involves the steps of (i) applying a uniform positive charge of approximately 600 volts on the surface of a photoreceptive element, (ii) exposing and partially discharging the surface of the photoreceptive element with a laser scanning device in an image-wise pattern to create a latent image, (iii) applying a liquid color toner to the latent image to form both a toned image and a uniform surface charge on the photoreceptive element, (iv) removing excess liquid toner, (v) drying the toned image, and (vi) transferring the toned image either directly or indirectly onto a final receptor. To form multi-colored images, steps (ii) through (v) are repeated until all the desired colors are formed on the photoreceptive element prior to transferring the images either directly or indirectly onto a final receptor. Unlike conventional electrophotographic processes, this process of forming multi-colored images may be accomplished without erasing the residual charge and recharging the surface of the photoreceptive element prior to scanning and developing a subsequent image. The liquid toner of the present invention provides sufficient charge in the imaged areas to allow the creation of a subsequent latent image without erasing and recharging the surface.

Once the toned image is formed on the photoreceptive element, the image may then be transferred to a final receptor (e.g., paper or film) using a variety of processes which are known in the art. Preferred processes for effecting transfer of the toner film are offset transfer processes such as those described in U.S. Pat. Nos. 5,108,865; and 5,204,722. The most preferred method of transferring the image from the photoreceptive element to the final receptor is described in co-pending U.S. patent application Kellie, et al. titled "Method and Apparatus having Improved Image Transfer Characteristics for Producing an Image on Plain Paper" filed on Sep. 29, 1995 (Ser. No. 08/536,687), incorporated herein by reference. This method uses an intermediate transfer roll which is coated with a silicone or fluorosilicone elastomer composition and heated to between 80–100° C. and which applies a force of approximately 40–80 $lb_f$ across the entire contact zone with the photoreceptor. Most preferred is the Dow Corning 94–003 fluorosilicone elastomer heated to between 85–95° C.

The substrate for receiving the image from the photoreceptive element can be any commonly used receptor material, such as paper, coated paper, polymeric films and primed or coated polymeric films. Polymeric films include plasticized and compounded polyvinyl chloride (PVC), acrylics, polyurethanes, polyethylene/acrylic acid copolymer, and polyvinyl butyrals. Commercially available composite materials such as those having the trade designations Scotchcal™, Scotchlite™, and Panaflex™ are also suitable for preparing substrates.

The transfer of the formed image from the charged surface to the final receptor or transfer medium may be enhanced by the incorporation of a release-promoting material within the dispersed particles used to form the image. The incorporation of a silicone-containing material or a fluorine-containing material in the outer (shell) layer of the particle facilitates the efficient transfer of the image.

These and other aspects of the present invention are demonstrated in the illustrative examples that follow.

EXAMPLES

The catalysts used in the examples are Azobisisobutyronitrile (designated as AIBN, VAZO™-64 available from DuPont Chemicals, Wilmington, Del.); Lucidol™ 98 (available from Atochem North America, Inc., Buffalo, N.Y.), and Dibutyl Tin Dilaurate (designated as DBTDL, available from Aldrich Chemical Co., Milwaukee, Wis.). The monomers are all available from Scientific Polymer Products, Inc., Ontario, N.Y. unless designated otherwise. It is understood that the listing of this source is not intended to limit the scope of this invention, and that equivalent chemicals are available from alternative suppliers.

The monomers used in the examples are designated by the following abbreviations: n-Butyl Acrylate (BA); Ethyl Acrylate (EA); 2-Hydroxyethyl Methacrylate (HEMA); Lauryl Acrylate or Dodecyl Acrylate (LA); Lauryl Methacrylate or Dodecyl Methacrylate (LMA); Methyl Methacrylate (MMA); Octadecyl Acrylate or Stearyl Acrylate (ODA); Octadecyl Methacrylate or Stearyl Methacrylate (ODMA); Syntene 160 polymerizable wax; an d Dimethyl-m-isopropenyl benzylisocyanate (TMI, available from CYTEC Industries, West Paterson, N.J.).

The following test methods were used to characterize the polymers of the following examples.

Percent Solids of Graft Stabilizer, Organosol and Liquid Toner:

Percent solids of the graft stabilizer solutions and the organosol and ink dispersions we re determined gravimetrically using an infrared drying oven attachment to a precision analytical balance (Mettler Instruments, Inc., Hightstown, N.J.). Approximately two grams of sample w ere used in each determination of percent solids using this sample dry down method.

Graft Stabilizer Molecular Weight:

Various properties of the graft stabilizer have been determined to be important to the performance of the stabilizer, including molecular weight and molecular weight polydispersity. Graft stabilizer molecular weight is normally expressed in term-s of the weight average molecular weight ($M_w$), while molecular weight polydispersity is given by the ratio of the weight average molecular weight to the number average molecular weight ($M_w/M_n$). Molecular weight parameters were determined for graft stabilizers with gel permeation chromatography (GPC) using tetrahydrofuran as the carrier solvent. Absolute $M_w$ was determined using a Dawn DSP-F light scattering detector (Wyatt Technology Corp., Santa Barbara, Calif.), while polydispersity was evaluated by ratioing the measured $M_w$ to a value of $M_n$ determined with an Optilab 903 differential refractometer detector (Wyatt Technology Corp., Santa Barbara, Calif.).

Organosol Particle Size:

Organosol particle size was determined by dynamic light scattering on a diluted toner sample (typically <0.0001 g/mL) using a Malvern Zetasizer III Photon Correlation Spectrometer (Malvern Instruments Inc., Southborough, Mass.). The dilute samples were ultrasonicated for one minute at 100 watts and 20 kiloHz (kHz) prior to measurement. Dynamic light scattering provides a fast method of determining the particle translational diffusion coefficient, which can be related to the z-average particle diameter without detailed knowledge of the optical and physical properties (i.e. refractive index, density and viscosity) of the organosol. Details of the method are described in Chu, B., *Laser Scattering* Academic Press, NY, 11A (1974). Since the organosols are comprised of nearly monodisperse, uniform spherical particles, dynamic light scattering provides an absolute measure of particle size for particles having diameters between 25–2500 nm.

Liquid Toner Properties:

The characterization of a liquid toner requires the measurement of a number of physical and chemical properties of the toner as well as direct evaluation of image quality obtained by developing the toner in a liquid electrophotographic imaging mechanism. The measured toner characteristics can be roughly broken down into size-related properties (particle size), charge-related properties (bulk and free phase conductivity, dynamic mobility and zeta potential, and charge/developed reflectance optical density (Q/ROD), a parameter which is directly proportional to the toner charge/mass.

Particle Size:

Toner particle size distributions were determined using a Horiba LA-900 laser diffraction particle size analyzer (Horiba Instruments, Inc., Irvine, Calif.). Toner samples were diluted approximately 1/500 by volume and sonicated for one minute at 150 watts and 20 kHz prior to measurement. Toner particle size was expressed on a number-average basis in order to provide an indication of the fundamental (primary) particle size of the ink particles.

Toner Conductivity:

The liquid toner conductivity (bulk conductivity, $k_b$) was determined at approximately 18 Hz using a Scientifica model 627 conductivity meter (Scientifica Instruments, Inc., Princeton, N.J.). In addition, the free (liquid dispersant) phase conductivity ($k_f$) in the absence of toner particles was also determined. Toner particles were removed from the liquid medium by centrifugation at 5° C. for 1–2 hours at 6,000 rpm (6,110 relative centrifugal force) in a Jouan MR1822 centrifuge (Winchester, Va.). The supernatant liquid was then carefully decanted, and the conductivity of this liquid was measured using a Scientifica Model 627 conductance meter. The percentage of free phase conductivity relative to the bulk toner conductivity was then determined as: 100% ($k_f/k_b$).

Particle Mobility:

Toner particle electrophoretic mobility (dynamic mobility) was measured using a Matec MBS-8000 Electrokinetic Sonic Amplitude Analyzer (Matec Applied Sciences, Inc., Hopkinton, Mass.). Unlike electrokinetic measurements based upon microelectrophoresis, the MBS-8000 instrument has the advantage of requiring no dilution of the toner sample in order to obtain the mobility value. Thus, it was possible to measure toner particle dynamic mobility at solids concentrations actually preferred in printing. The MBS-8000 measures the response of charged particles to high frequency (1.2 MHz) alternating (AC) electric fields. In a high frequency AC electric field, the relative motion between charged toner particles and the surrounding dispersion medium (including counter-ions) generates an ultrasonic wave at the same frequency of the applied electric field. The amplitude of this ultrasonic wave at 1.2 MHz can be measured using a piezoelectric quartz transducer; this electrokinetic sonic amplitude (ESA) is directly proportional to the low field AC electrophoretic mobility of the particles. The particle zeta potential can then be computed by the instrument from the measured dynamic mobility and the known toner particle size, liquid dispersant viscosity and liquid dielectric constant.

Particle Charge:

Toner charge/mass is an important, albeit difficult to determine parameter useful in predicting the development characteristics (e.g. optical density, overtoning uniformity) for liquid toners. The difficult in determining charge/mass for liquid toners arises from the low developed toner mass (typically 50–200 micro grams/cm$^2$) associated with the desired developed optical densities (typically >1.2 reflectance optical density units). A related parameter which is directly proportional to toner charge/mass is the toner charge/developed optical density. This parameter was determined by plating ink particles in distinct bands covering a range of known plating potentials onto a dielectric sheet coated with a silicone release layer while simultaneously monitoring the total current flow with a sensitive electrometer. The resulting plated toner layer was then air dried and transferred using an offset transfer process to plain paper. The reflectance optical density of the completely transferred toner film on paper was determined using a Gretag SPM50 reflectance optical densitometer (Gretag Instruments Inc., Regensdorf, Switzerland). The ratio of the total current to the product of the plated toner area and the developed optical density yields the charge/ROD value for that toner, i.e. Charge/ROD=(Total Current)/[(Plated Area)(Reflectance Optical Density)].

Examples 1–6 describe preparations for different types of copolymer graft stabilizers; Examples 7–8 illustrate comparative tacky organosols without PCC's; Examples 9–13 illustrate non-tacky organosols which incorporate PCC's; Example 14 is a comparative example illustrating a tacky organosol and toners prepared over a range of core $T_g$s; Example 15 is an example of a non-tacky organosol and representative toners prepared over a range of core $T_g$s; and Examples 16–19 illustrate liquid color toners based on non-tacky organosols which incorporate PCC's.

GRAFT STABILIZERS

In the following examples of graft stabilizer preparation, it will be convenient to summarize the compositional details of each particular graft stabilizer by ratioing the weight percentages of monomers used to create the graft stabilizer precursor. The grafting site composition is then expressed as a weight percentage of the monomers comprising this graft stabilizer precursor. For example, a graft stabilizer designated ODA/ODMA/HEMA-TMI (48.5/48.5/3-4.7% w/w) is made from a graft stabilizer precursor which is a copolymer consisting of 48.5 weight percent ODA, 48.5 weight percent ODMA and 3.0 percent HEMA, to which is covalently bonded a grafting site consisting of 4.7 weight percent TMI based on the total weight of the graft stabilizer precursor.

Preparations of Copolymer Graft Stabilizers:

Example 1

Comparative

A 5000 mL 3-necked round bottom flask equipped with a condenser, a thermocouple connected to a digital temperature controller, a nitrogen inlet tube connected to a source of dry nitrogen and a magnetic stirrer, was charged with a mixture of 2373 g of Norpar™ 12, 1019 g of LMA, 33 g of 96% HEMA and 10.5 g of AIBN. While magnetically-stirring the mixture, the reaction flask was purged with dry nitrogen for 30 minutes at a flowrate of approximately 2 liters/minute. A hollow glass stopper was then inserted into the open end of the condenser and the nitrogen flowrate was reduced to approximately 0.5 liters/min. The mixture was heated to 70° C. with stirring, and the mixture was allowed to polymerize at 70° C. for 16 hours. The conversion was quantitative.

The mixture was heated to 90° C. and held at that temperature for 1 hour to destroy any residual AIBN, then was cooled back to 70° C. The nitrogen inlet tube was then removed, and 16.3 g of 95% DBTDL were added to the mixture, followed by 49.4 g of TMI. The TMI was added dropwise over the course of approximately five minutes while magnetically stirring the reaction mixture. The nitrogen inlet tube was replaced, the hollow glass stopper in the condenser was removed, and the reaction flask was purged with dry nitrogen for 30 minutes at a flowrate of approximately 2 liters/minute. The hollow glass stopper was reinserted into the open end of the condenser and the nitrogen flowrate was reduced to approximately 0.5 liters/min. The mixture was allowed to react at 70° C. for 6 hours, at which time the conversion was quantitative.

The mixture was then cooled to room temperature. The cooled mixture was a viscous, transparent liquid containing no visible insoluble matter. The percent solids of the liquid mixture was determined as 30.0% using the infrared drying method described above. Subsequent determination of molecular weight was made using the GPC method described above; the copolymer had a $M_w$ of 197,750 Da and a $M_w/M_n$ of 1.84 based upon two independent measurements. The product is a copolymer of LMA and HEMA containing random side chains of TMI and is designated herein as LMA/HEMA-TMI (97/3-4.7% w/w). A dried film cast from this polymer solution was extremely tacky when evaluated by the thumb test at 22° C.

Example 2

Comparative

An 8 ounce (0.24 liter), narrow-mouthed glass bottle was charged with 36.58 g of NORPAR 12, 12.13 g of LA, 0.39 g of 96% HEMA and 0.13 g of AIBN. The bottle was purged for one minute with dry nitrogen at a rate of approximately 1.5 liters/minute, then sealed with a screw cap fitted with a teflon liner. The cap was secured in place using electrical tape. The sealed bottle was then inserted into a metal cage assembly and installed on the agitator assembly of an Atlas Launder-Ometer (Atlas Electric Devices Company, Chicago, Ill.). The Launder-Ometer was operated at its fixed agitation speed of 42 rpm with a water bath temperature of 70° C. The mixture was allowed to react for approximately 16–18 hours, at which time the conversion of monomer to polymer was quantitative. The mixture was heated to 90° C. for 1 hour to destroy any residual AIBN, then was cooled to room temperature.

The bottle was then opened and 0.19 g of 95% DBTDL and 0.59 g of TMI were added to the cooled mixture. The bottle was purged for 1 minute with dry nitrogen at a rate of approximately 1.5 liters/minute, then sealed with a screw cap fitted with a teflon liner. The cap was secured in place using electrical tape. The sealed bottle was then inserted into a metal cage assembly and installed on the agitator assembly of the Atlas Launder-Ometer. The Launder-Ometer was operated at its fixed agitation speed of 42 rpm with a water bath temperature of 70° C. The mixture was allowed to react for approximately 4–6 hours, at which time the conversion was quantitative. The mixture was then cooled to room temperature. The cooled mixture was a viscous, cloudy solution, containing a small amount of visibly phase separated polymer in the form of a thin sediment layer.

The percent solids of the liquid mixture was determined as 26.12% using the infrared drying method described above. Subsequent determination of molecular weight was made using the GPC method described above; the copolymer had a $M_w$ of 204,500 Da and a $M_w/M_n$ of 2.385 based upon two independent measurements. The product is a copolymer of LA and HEMA containing random side chains of TMI and is designated herein as LA/HEMA-TMI (97/3-4.7% w/w). A dried film cast from this polymer solution was moderately tacky when evaluated by the thumb test at 22° C.

Example 3

A 500 mL 3-necked round bottom flask equipped with a condenser, a thermometer coupled to a Thermo-Watch temperature controller, a nitrogen inlet tube connected to a source of dry nitrogen and a magnetic stirrer, was charged with a mixture of 162.8 g of Isopar™ L, 90.9 g of ODA@48% in Toluene, 43.7 g of LMA, 27.0 g of 96% HEMA and 0.90 g of AIBN. While magnetically-stirring the mixture, the reaction flask was purged with dry nitrogen for 10 minutes at a flowrate of approximately 1 liter/minute. A hollow glass stopper was then inserted into the open end of the condenser and the nitrogen flowrate was reduced to approximately 0.5 liters/min. The mixture was heated to 70° C. with stirring, and the mixture was allowed to polymerize at 70° C. for 18 hours. The conversion was quantitative.

The mixture was heated to 90° C. and held at that temperature for 1.5 hours to destroy any residual AIBN, then was cooled back to 70° C. The nitrogen inlet tube was then removed, and 1.36 g of 95% DBTDL were added to the mixture, followed by 4.23 g of TMI. The TMI was added dropwise over the course of approximately five minutes while magnetically stirring the reaction mixture. The nitrogen inlet tube was replaced, the hollow glass stopper in the condenser was removed, and the reaction flask was purged with dry nitrogen for 10 minutes at a flowrate of approximately 1 liter/minute. The hollow glass stopper was reinserted into the open end of the condenser and the nitrogen flowrate was reduced to approximately 0.5 liters/min. The mixture was allowed to react at 70° C. for 4 hours, at which time the conversion was quantitative.

The mixture was then cooled to room temperature. The cooled mixture was a viscous, slightly cloudy, translucent liquid which showed no signs of phase separation. The percent solids of the mixture was not determined, nor was the molecular weight of the polymer product measured. The product is a copolymer of ODA, LMA and HEMA having random side chains of TMI and is designated herein as ODA/LMA/HEMA-TMI (48.5/48.5/3-4.7% w/w). A dried film cast from this polymer solution was completely non-tacky when evaluated by the thumb test at 22° C.

Example 4

Using the method and apparatus of Example 1, 2049 g of NORPAR 12, 832 g of ODA (61.18% in Toluene, 509 g ODMA, 33 g of 96% HEMA and 10.5 g of AIBN were combined in a reaction flask. The resulting mixture reacted at 70° C. for 16 hours. The mixture was then heated to 90° C. for 1 hour to destroy any residual AIBN, then was cooled back to 70° C. To the cooled mixture was then added 16.3 g of 95% DBTDL and 49.4 g of TMI. The TMI was added dropwise over the course of approximately five minutes while magnetically stirring the reaction mixture. Following the procedure of Example 1, the mixture was reacted at 70° C. for approximately 6 hours at which time the reaction was quantitative. The mixture was then cooled to room temperature. The cooled mixture was a viscous, light yellow-colored, transparent liquid.

The percent solids of the liquid mixture was determined to be 32.3 1% using the infrared drying method described above. Subsequent determination of molecular weight was made using the GPC method described above; the copolymer had a $M_w$ of 175,141 Da and $M_w/M_n$ of 4.27 based on two independent measurements. The product is a terpolymer containing ODA, ODMA and HEMA having random side chains of TMI and is designated herein as ODA/ODMA/HEMA-TMI (48.5/48.5/3-4.7% w/w). A dried film cast from this polymer solution was completely non-tacky when evaluated by the thumb test at 22° C.

Example 5

Using the method and apparatus of Example 2, 37.28 g of NORPAR 12, 12 g of ODMA, 4 g of BA, 0.516 g of 96% HEMA and 0.165 g of AIBN were combined in a reaction bottle and the resulting mixture reacted at 70° C. for 16–18 hours. The mixture was then heated to 90° C. for 1 hour to destroy any residual AIBN, then was cooled to room temperature. To the cooled mixture was then added 0.256 g of 95% DBTDL and 0.776 g of TMI. Following the procedure of Example 2, the mixture was reacted at 70° C. for approximately 4–6 hours at which time the reaction was quantitative. The mixture was then cooled to room temperature. The cooled mixture was a highly viscous, clear solution containing no visibly phase separated polymer.

The percent solids of the liquid mixture was determined to be 31.79% using the infrared drying method described above. Subsequent determination of molecular weight was made using the GPC method described above; the copolymer had a $M_w$ of 867,800 Da and $M_w/M_n$ of 2.00 based on two independent measurements. The product is a polymer containing ODMA, BA and HEMA having random side chains of TMI and is designated herein as ODMA/BA/HEMA-TMI (72.75/24.25/3-4.7% w/w). A dried film cast from this polymer solution was completely non-tacky when evaluated by the thumb test at 22° C.

Example 6

A 2,000 mL 3-necked round bottom flask equipped with a condenser, a thermometer coupled to a Thermo-Watch temperature controller, a nitrogen inlet tube connected to a source of dry nitrogen and a magnetic stirrer, was charged with a mixture of 533.6 g of Isopar™ L, 64.7 g of LMA, 64.7 g of Syntene 160, 4.0 g of 96% HEMA and 2.7 g of Lucidol™ 98. While magnetically-stirring the mixture, the reaction flask was purged with dry nitrogen for 20 minutes at a flowrate of approximately 1 liter/minute. A hollow glass stopper was then inserted into the open end of the condenser and the nitrogen flowrate was reduced to approximately 0.5 liters/min. The mixture was heated to 80° C. with stirring, and the mixture was allowed to polymerize at 80° C. for 20 hours.

The mixture was heated to 100° C. and held at that temperature for 1 hour to destroy any residual Lucidol™ 98, then was cooled back to 70° C. The nitrogen inlet tube was then removed, and 1.97 g of 95% DBTDL were added to the mixture, followed by 6.3 g of TMI. The TMI was added dropwise over the course of approximately five minutes while magnetically stirring the reaction mixture. The nitrogen inlet tube was replaced, the hollow glass stopper in the condenser was removed, and the reaction flask was purged with dry nitrogen for 20 minutes at a flowrate of approximately 1 liter/minute. The hollow glass stopper was reinserted into the open end of the condenser and the nitrogen flowrate was reduced to approximately 0.5 liters/min. The mixture was allowed to react at 70° C. for 4 hours, at which time the conversion was 96.7%.

The mixture was then cooled to room temperature. Tile cooled mixture was a viscous, very cloudy, translucent liquid which showed a slight amount of precipitate at room temperature. The percent solids of the mixture was 19.3%, but the molecular weight of the polymer product was not measured. The product is a copolymer of Syntene 160, LMA and HEMA having random side chains of TMI and is designated herein as Syntene 160/LMA/IEMA-TMI (48.5/48.5/3-4.7% w/w). A dried film cast from this polymer solution was completely non-tacky when evaluated by the thumb test at 22° C.

ORGANOSOL EXAMPLES

In the following examples of organosol preparation, it will be convenient to summarize the composition of each particular organosol in terms of the ratio of the total weight of monomers comprising the organosol core relative to the total weight of graft stabilizer comprising the organosol shell. This ratio is referred to as the core/shell ratio of the organosol. In addition, it will be useful to summarize the compositional details of each particular organosol by ratioing the weight percentages of monomers used to create the shell and the core. For example, an organosol designated ODA/ODMA/HEMA-TMI//MMA/EA (48.5/48.5/3-4.7/125/75% w/w) is made from shell comprised of a graft stabilizer precursor which is a copolymer consisting of 48.5 weight percent ODA, 48.5 weight percent ODMA and 3.0 percent HEMA, to which is covalently bonded a grafting site consisting of 4.7 weight percent TMI based on the total weight of the graft stabilizer precursor. This graft stabilizer is covalently bonded to an organosol core which is comprised of 25 weight percent MMA and 75 weight percent EA.

Example 7

Comparative

This is a comparative example using the graft stabilizer in Example 1 to prepare a tacky organosol. A 5000 mL 3-necked round bottom flask equipped with a condenser, a thermocouple connected to a digital temperature controller, a nitrogen inlet tube connected to a source of dry nitrogen and a magnetic stirrer, was charged with a mixture of 2981 g of NORPAR 12, 210 g of EA, 70 g of MMA, 233.3 g of the graft stabilizer mixture from Example 1@30.0%, and 5.3 g of AIBN. While magnetically-stirring the mixture, the reaction flask was purged with dry nitrogen for 30 minutes at a flowrate of approximately 2 liters/minute. A hollow glass stopper was then inserted into the open end of the condenser and the nitrogen flowrate was reduced to approximately 0.5 liters/min. The mixture was heated to 70° C. with stirring, and the mixture was allowed to polymerize at 70° C. for 16 hours. The conversion was quantitative.

Approximately 700 g of n-heptane were added to the cooled organosol, and the resulting mixture was stripped of residual monomer using a rotary evaporator equipped with a dry ice/acetone condenser and operating at a temperature of 90° C. and a vacuum of approximately 15 mm Hg. The stripped organosol was cooled to room temperature, yielding an opaque blue-white dispersion which did not gel.

This tacky organosol is designated LMA/HEMA-TMI//MMA/EA (97/3-4.71/25/75% w/w) having a calculated $T_g$ equal to −1° C. and can be used to prepare ink formulation with significant residual tack. The percent solids of this organosol dispersion was determined as 11.68% using the infrared drying method described above. Subsequent determination of average particle size was made using the dynamic light scattering method described above; the organosol had a z-average diameter of 94.6 nm). A dried film cast from this polymer solution was extremely tacky when evaluated by the thumb test at 22° C.

Example 8

Comparative

This is a comparative example using the graft stabilizer in Example 2 to prepare a tacky organosol with a core/shell ratio of 4/1. In a one quart (0.946 liter), amber, narrow-mouthed glass bottle was charged 243.09 g of NORPAR 12, 21.60 g of EA, 7.20 g of MMA, 27.57 g of the graft stabilizer mixture from Example 5@26.12%, and 0.54 g of AIBN. The bottle was purged for three minutes with dry nitrogen at a rate of approximately 1.5 liters/minute, then sealed with a screw cap fitted with a teflon liner. The cap was secured in place using electrical tape. The sealed bottle was then inserted into a metal cage assembly and installed on the agitator assembly of an Atlas Launder-Ometer. The Launder-Ometer was operated at its fixed agitation speed and a water bath temperature of 70° C. The mixture was allowed to react for approximately 16–18 hours, at which time the resulting organosol was cooled to room temperature.

Approximately 60 g of n-heptane were added to the cooled organosol, and the resulting mixture was stripped of residual monomer using a rotary evaporator equipped with a dry ice/acetone condenser and operating at a temperature of 90° C. and a vacuum of approximately 15 mm Hg. The stripped organosol was cooled to room temperature, yielding an opaque white dispersion which did not gel.

This tacky organosol is designated LA/HEMA-TMI//MMA/EA (97/3-4.7//25/75% w/w) having a calculated $T_g$ equal to $-1°$ C. and can be used to prepare slightly tacky ink formulations. The percent solids of this organosol dispersion was determined as 14.10% using the infrared drying method described above. Subsequent determination of average particle size was made using the dynamic light scattering method described above; the organosol had a z-average diameter of 156.8 nm. A dried film cast from this polymer solution was moderately tacky when evaluated by the thumb test at 22° C.

Example 9

This example illustrates the use of the graft stabilizer in Example 3 to prepare a very slightly tacky organosol with a core/shell ratio of 4/1. A 1,000 ml 3-necked round bottom flask equipped with a condenser, a thermometer coupled to a Thermo-Watch temperature controller, a nitrogen inlet tube connected to a source of dry nitrogen and a magnetic stirrer, was charged with a mixture of 552 g of Isopar™ L, 66.5 g of the graft stabilizer from Example 3, 46.6 g of EA and 1.0 g of AIBN. While magnetically-stirring the mixture, the reaction flask was purged with dry nitrogen for 10 minutes at a flowrate of approximately 1 liter/minute. A hollow glass stopper was then inserted into the open end of the condenser and the nitrogen flowrate was reduced to approximately 0.5 liters/min. The mixture was heated to 70° C. with stirring, and the mixture was allowed to polymerize at 70° C. for 21 hours, at which time the organosol was cooled to room temperature.

Approximately 250 g of n-heptane were added to the cooled organosol, and the resulting mixture was stripped of residual monomer using a rotary evaporator equipped with a dry ice/acetone condenser and operating at a temperature of 90° C. and a vacuum of approximately 15 mm Hg. The stripped organosol was cooled to room temperature, yielding an opaque white dispersion.

This very slightly tacky organosol is designated ODA/LMA/HEMA-TMI//EA (48.5/48.5/3-4.7//100% w/w) having a calculated $T_g$ equal to $-24°$ C. and can be used to prepare ink formulation without measurable residual tack. The percent solids of this organosol dispersion was determined as 11.70% using the infrared drying method described above. A particle size determination was not made for this organosol. A dried film cast from this polymer solution was only very slightly tacky when evaluated by the thumb test at 22° C.

Example 10

This example illustrates the use of the graft stabilizer in Example 3 to prepare a non-tacky organosol with a core/shell ratio of 4/1. A 2,000 mL 3-necked round bottom flask equipped with a condenser, a thermometer coupled to a Thermo-Watch temperature controller, a nitrogen inlet tube connected to a source of dry nitrogen and a magnetic stirrer, was charged with a mixture of 1103.9 g of Isopar™ L, 133 g of the graft stabilizer from Example 3, 22.34 g of MMA, 70.76 g EA and 2.0 g of AIBN. While magnetically-stirring the mixture, the reaction flask was purged with dry nitrogen for 20 minutes at a flowrate of approximately 1 liter/minute. A hollow glass stopper was then inserted into the open end of the condenser and the nitrogen flowrate was reduced to approximately 0.5 liters/min. The mixture was heated to 70° C. with stirring, and the mixture was allowed to polymerize at 70° C. for 21 hours, at which time the organosol was cooled to room temperature.

Approximately 250 g of n-heptane were added to the cooled organosol, and the resulting mixture was stripped of residual monomer using a rotary evaporator equipped with a dry ice/acetone condenser and operating at a temperature of 90° C. and a vacuum of approximately 15 mm Hg. The stripped organosol was cooled to room temperature, yielding an opaque white dispersion.

This non-tacky organosol is designated ODA/LMA/HEMA-TMI//MMA/EA (48.5/48.5/3-4.7//24/76% w/w) having a calculated $T_g$ equal to $-1°$ C. and can be used to prepare ink formulation without measurable residual tack. The percent solids of this organosol dispersion was determined as 12.5% using the infrared drying method described above. A particle size determination was not made for this organosol. A dried film cast from this polymer solution exhibited no tack when evaluated by the thumb test at 22° C.

Example 11

This is an example using the graft stabilizer in Example 4 to prepare a non-tacky organosol with a core/shell ratio of 4/1. Using the method and apparatus of Example 7, 2898 g of NORPAR 12, 336 g of EA, 260 g of the graft stabilizer mixture from Example 4 (32.31% polymer solids, and 6.3 g of AIBN were combined in a reaction flask. The resulting mixture was heated to 70° C. and reacted for 16 hours, at which time the resulting organosol was cooled to room temperature. After stripping the organosol using the method of Example 7 to remove residual monomer, the stripped organosol was cooled to room temperature, yielding an opaque yellow-white dispersion.

This non-tacky organosol is designated ODA/ODMA/IIEMA-TMI/EA (48.5/48.5/3-4.7/100% w/w) having a calculated $T_g$ equal to $-24°$ C. and can be used to prepare non-tacky, non-blocking ink formulations. The percent solids of this non-gel organosol dispersion was determined as 13.3% using the infrared drying method described above. Subsequent determination of average particle size was made using the dynamic light scattering method described above; the organosol had a z-average diameter of 130.1 nm. A dried film cast from this polymer solution exhibited no tack when evaluated by the thumb test at 22° C.

Example 12

This is an example using the graft stabilizer in Example 4 to prepare a non-tacky organosol with a core/shell ratio of 4/1. Using the method and apparatus of Example 7, 2898 g of NORPAR 12,252 g of EA, 84 g of MMA, 260 g of the graft stabilizer mixture from Example 4 (32.31% polymer solids, and 6.3 g of AIBN were combined in a reaction flask. The resulting mixture was heated to 70° C. and reacted for 16 hours, at which time the resulting organosol was cooled to room temperature. After stripping the organosol using the method of Example 7 to remove residual monomer, the stripped organosol was cooled to room temperature, yielding an opaque yellow-white dispersion.

This non-tacky organosol is designated ODA/ODMA/HEMA-ITMI//MMA/EA (48.5/48.5/3-4.7//25/75% w/w) having a calculated $T_g$ equal to −1° C. and can be used to prepare non-tacky, non-blocking ink formulations. The percent solids of this non-gel organosol dispersion was determined as 13.6% using the infrared drying method described above. Subsequent determination of average particle size was made using the dynamic light scattering method described above; the organosol had a z-average diameter of 122.3 nm. A dried film cast from this polymer solution exhibited no tack when evaluated by the thumb test at 22° C.

Example 13

This is an example using the graft stabilizer in Example 6 to prepare a non-tacky organosol. Using the method and apparatus of Example 9, 239.2 g of Isopar™ L, 23.0 g of EA, 7.3 g of MMA, 42.6 g of the graft stabilizer mixture from Example 6@19.3% polymer solids, and 0.9 g of Lucidol™ 98 were combined in a reaction flask. The resulting mixture was heated to 80° C. and reacted for 7 hours, at which time the resulting organosol was cooled to room temperature. After stripping the organosol using the method of Example 7 to remove residual monomer, the stripped organosol was cooled to room temperature, yielding an opaque white dispersion.

This non-tacky organosol is designated Syntene 1 60/LMA/HEMA-TMI//MMA/EA (48.5/48.5/3-4.7//24/76% w/w) having a calculated $T_g$ equal to 2° C. and can be used to prepare non-tacky ink formulations. The percent solids of this organosol dispersion was determined as 15. 1% using the infrared drying method described above. Subsequent determination of average particle size was made using the dynamic light scattering method described above; the organosol had a z-average diameter of 335.6 nm.

Example 14

Comparative

This is an example using an LMA/HEMA-TMI (97/3-4.7% w/w) graft stabilizer prepared identically to that of Example I to prepare a series of four tacky organosols with the same graft stabilizer composition but varying core $T_g$. The stabilizer had a $M_w$ of 217,300 and $M_w/M_n$ of 2.09. The organosols were prepared at calculated core $T_g$'s of −5° C., −10° C., −15° C. and −24° C. by varying the weight ratio of MMA/EA (X/Y) in the organosol core. The formulations are summarized in Table II.

Using the method and apparatus of Example 8, 248 g of NORPAR 12, X g of EA, Y g of MMA (X and Y are listed in Table II), 23.1 g of a graft stabilizer mixture prepared as in Example 1@31. 11% polymer solids, and 0.54 g of AIBN were combined in four separate one quart (0.946 liter), amber, narrow-mouthed glass bottles. The bottles were purged for three minutes with dry nitrogen at a rate of approximately 1.5 liters/minute, then sealed with screw caps fitted with a teflon liner. The caps were secured in place using electrical tape. The sealed bottles were then inserted into metal cage assemblies and installed on the agitator assembly of an Atlas Launder-Ometer. The Launder-Ometer was operated at its fixed agitation speed and a water bath temperature of 70° C. The four separate reaction mixtures were allowed to react for approximately 16–18 hours, at which time the resulting organosols were cooled to room temperature.

Approximately 60 g of n-heptane were added to each of the cooled organosols, and the resulting mixtures were stripped of residual monomer using a rotary evaporator equipped with a dry ice/acetone condenser and operating at a temperature of 90° C. and a vacuum of approximately 15 mm Hg. The stripped organosols were cooled to room temperature, yielding opaque white dispersions which did not gel.

The resulting organosols were cast as films by placing 25 g of each organosol in a 3×4 inch rectangular aluminum pan and drying for 24 hours at 150° C. These organosol films were tested for thumb tack and probe tack at room temperature. Probe tack was determined according to ASTM Test Method D2979 using a Polykem Tack Tester operated at a withdrawal speed of 20 mm/sec after contacting the probe to the test film for 2.0 seconds. The results of these tests are summarized in Table II.

TABLE II

Summary of Performance Data for Examples 14 and 15
All Values at 22° C.

| Organosol ID (Core $T_g$) | MMA in Core X (g) | EA in Core Y (g) | Thumb Tack | Probe Tack (g) | Blocking | Image Erasure Resistance (%) |
|---|---|---|---|---|---|---|
| LMA/HEMA-TMI/MMA/EA | | | | | | |
| Example 14 (−5° C.) | 6 | 23 | High | 567 | Slight | 39 |
| Example 14 (−10° C.) | 4 | 24 | High | 1264 | Moderate | 68 |
| Example 14 (−15° C.) | 3 | 26 | High | 1247 | High | 80 |
| Example 14 (−24° C.) | 0 | 29 | High | 481 | High | 97 |
| ODA/ODMA/ HEMA-TMI/MMA/EA | | | | | | |
| Example 15 (−5° C.) | 6 | 23 | None | 0 | None | 95 |
| Example 15 (−10° C.) | 4 | 24 | None | 0 | None | 97 |
| Example 15 (−15° C.) | 3 | 26 | None | 0 | None | 98 |
| Example 15 (−24° C.) | 0 | 29 | None | 0 | None | 99 |

In addition, the organosols were converted to cyan toner at an organosol/pigment ratio of 6 using the following method: approximately 250 g of each organosol at nominal 12% (w/w) solids in NORPAR 12 were separately combined with 44g of NORPAR 12, 5 g of Pigment Blue 15:3 (C.I 74160:3; #249-1282, Sun Chemical Company, Cincinnati, Ohio) and 2.34 g of 6.16% Zirconium HEX-CEM solution (OMG Chemical Company, Cleveland, Ohio) in eight ounce glass jars. The mixtures were then milled in 0.5 liter vertical bead mills (Model 6TSG-1/4, Aimex Co., Ltd., Tokyo, Japan) charged with 390 g of 1.3 mm diameter Potters glass beads (Potters Industries, Inc., Parsippany, N.J.). The mills were operated at 2,000 RPM for 1.5 hours without cooling water circulating through the cooling jacket of the milling chambers.

The resulting cyan toner was diluted to 2.5% (w/w) solids with NORPAR 12 then this working strength toner was tested on the toner plating apparatus described previously. The reflection optical density (ROD) for each toner was adjusted to 1.3 by controlling the plating voltages; the solid area developed areas were transferred to standard Xerox photocopying paper. The resulting test sheets were subjected to the thermoplastic adhesive blocking test as defined in ASTM Test Method D1146-88. Erasability was also evaluated by measuring the reduction in reflectance optical density for a solid developed image area on the final receptor after abrading for twenty passes in one direction with an eraser on a standard #2 pencil applied to the image using normal hand pressure. Image erasure resistance (IER), defined as 100*(reflectance optical density after twenty eraser passes)/(initial reflectance optical density), provides a convenient measure of image durability. The results are summarized in Table II.

Note that all four of these organosols exhibited high residual tack with respect to both thumb tack and probe tack, and that black toners prepared from these organosols exhibited generally poor blocking resistance but good erasure resistance. Tack and blocking tendency generally increased as the $T_g$ of the organosol core decreased, while erasure resistance increased with decreasing core $T_g$.

Example 15

This is an example using an ODA/ODMA/HEMA-TMI (48.5/48.5/3-4.7% w/w) graft stabilizer prepared identically to that of Example 4 to prepare a series of four non-tacky organosols with the same graft stabilizer composition but varying core $T_g$. The stabilizer had a $M_w$ of 189,220 and a $M_w/M_n$ of 4.14. The organosols were prepared at calculated core $T_g$'s of −5° C., −10° C., −15° C. and −24° C. by varying the weight ratio of MMA/EA (X/Y) in the organosol core. The formulations are summarized in Table II.

Using the method and apparatus of Example 8, 249 g of NORPAR 12, X g of EA, Y g of MMA (X and Y are listed in Table II), 22.1 g of a graft stabilizer mixture prepared as in Example 4@32.6% polymer solids, and 0.54 g of AIBN were combined in four separate one quart (0.946 liter), amber, narrow-mouthed glass bottles. The bottles were purged for three minutes with dry nitrogen at a rate of approximately 1.5 liters/minute, then sealed with screw caps fitted with a teflon liner. The caps were secured in place using electrical tape. The sealed bottles were then inserted into metal cage assemblies and installed on the agitator assembly of an Atlas Launder-Ometer. 1The Launder-Ometer was operated at its fixed agitation speed and a water bath temperature of 70° C. The four separate reaction mixtures were allowed to react for approximately 16–18 hours, at which time the resulting organosols were cooled to room temperature.

Approximately 60 g of n-heptane were added to each of the cooled organosols, and the resulting mixtures were stripped of residual monomer using a rotary evaporator equipped with a dry ice/acetone condenser and operating at a temperature of 90° C. and a vacuum of approximately 15 mm Hg. The stripped organosols were cooled to room temperature, yielding opaque white dispersions which did not gel.

The resulting organosols were cast as films by placing 25 g of each organosol in a 3×4 inch rectangular aluminum pan and drying for 24 hours at 150° C. These organosol films were tested for thumb tack and probe tack at room temperature. Probe tack was determined according to ASTM Test Method D2979 using a Polykem Tack Tester operated at a withdrawal speed of 20 mm/sec after contacting the probe to the test film for 2.0 seconds. The result of these tests are summarized in Table II.

In addition, the organosols were converted to black toner at an organosol/pigment ratio of 6 using the following method: approximately 250 g of each organosol at nominal 12% (w/w) solids in NORPAR 12 were separately combined with 44 g of NORPAR 12, 5 g of Pigment Blue 15:3 (C.I 74160:3; #249-1282 and 2.34 g of 6.16% Zirconium HEX-CEM solution (OMG Chemical Company, Cleveland, Ohio) in eight ounce glass jars. The mixtures were then milled in 0.5 liter vertical bead mills (Model 6TSG-1/4, Aimex Co., Ltd., Tokyo, Japan) charged with 390 g of 1.3 mm diameter Potters glass beads (Potters Industries, Inc., Parsippany, N.J.). The mills were operated at 2,000 RPM for 1.5 hours without cooling water circulating through the cooling jacket of the milling chambers.

The resulting cyan toners were diluted to 2.5% (w/w) solids with NORPAR 12 then these working strength toners were tested on the toner plating apparatus described previously. The reflection optical density (ROD) for each toner was adjusted to 1.4 by controlling the plating voltages; the solid area developed areas were transferred to standard Xerox photocopying paper. The resulting test sheets were subjected to the thermoplastic adhesive blocking test as defined in ASTM Test Method D1146-88. Erasability was also evaluated by measuring the reduction in reflectance optical density for a solid developed image area on the final receptor after abrading for twenty passes in one direction with an eraser on a standard #2 pencil applied to the image using normal hand pressure. Image erasure resistance (IER), defined as 100*(reflectance optical density after twenty eraser passes)/(initial reflectance optical density), provides a convenient measure of image durability. The results are summarized in Table II.

Note that all four of these organosols exhibited no residual tack with respect to both thumb tack and probe tack, and that black toners prepared from these organosols exhibited excellent blocking resistance and good erasure resistance. Tack, blocking tendency and erasure resistance were all independent of the $T_g$ of the organosol core.

LIQUID TONER EXAMPLES

Example 16

This is an example of preparing a cyan liquid toner at an organosol/pigment ratio of 4 using the non-tacky organosol prepared at core/shell of 4 in Example 11. Approximately 225 g of the organosol@12.8% (w/w) solids in NORPAR 12 were combined with 65 g of NORPAR 12, 7 g of Pigment Blue 15:3 (C.I. 74160:3; #249-1282) and 2.34 g of 6.16% Zirconium HEX-CEM solution (OMG Chemical Company, Cleveland, OH) in an eight ounce glass jar. This mixture was then milled in a 0.5 liter vertical bead mill (Model 6TSG- 1a4, Aimex Co., Ltd., Tokyo, Japan) charged with 390 g of 1.3 mm diameter Potters glass beads (Potters Industries, Inc., Parsippany, NJ). The mill was operated at 2,000 RPM for 1.5 hours without cooling water circulating through the cooling jacket of the milling chamber.

A portion of this 12% (w/w) solids toner concentrate was diluted to approximately 1.0% (w/w). This dilute toner sample exhibited the following proper ties as determined using the test methods described above:

Number Mean Particle Size: 0.35 micron Bulk Conductivity: 189 picoMhos/cm Percent Free Phase Conductivity: 16% Dynamic Mobility: 0.0C1l88 micron-cm/[Volt-second] Zeta Potential: 38.7 mV This working strength toner was te ste d on the toner plating apparatus described previously. The reflection optical density (ROD) was greater than 1.2 at plating voltages greater than 350 volts.

Example 17

This is an example of preparing a yellow liquid toner at an 0 organosol/pigment ratio ofu 4 us ing the non-tacky organosol prepared at core/shell of4 in Example I1. Ap pr oximately 225 g of the organosol 12.8% (w/w) solids in NORPAR 12 were combined with 65 g of NORPAR 12, 7 g of Pigment Yellow 83 (C.I. 21108; #275-0570, Sun Chemical Company, Cincinnati, OH) and 2.34 g of 6.16% Zirconium HEX-CEM solution (OMG Chemical Company, Cleveland, Ohio) in an eight ounce glass jar. This mixture was then milled in a 0.5 liter vertical bead mill (Model 6TSG-1/4, Aimex Co., Ltd., Tokyo, Japan) charged with 390 g of 1.3 mm diameter Potters glass beads (Potters Industries, Inc., Parsippany, N.J.). The mill was operated at 2,000 RPM for 1.5 hours without cooling water circulating through the cooling jacket of the milling chamber.

A portion of this 12% (w/w) solids toner concentrate was diluted to approximately 1.0% (w/w). This dilute toner sample exhibited the following properties as determined using the test methods described above:

Number Mean Particle Size: 0.24 micron

Bulk Conductivity: 237 picoMhos/cm

Percent Free Phase Conductivity: 17%

Dynamic Mobility: 0.0217 micron-cm/[Volt-second]

Zeta Potential: 44.8 mV

This working strength toner was tested on the toner plating apparatus described previously. The reflection optical density (ROD) was greater than 1.0 at plating voltages greater than 400 volts.

Example 18

This is an example of preparing a magenta liquid toner at an organosol/pigment ratio of 4 using the non-tacky organosol prepared at core/shell of 4 in Example 11. Approximately 225 g of the organosol@12.8% (w/w) solids in NORPAR 12 were combined with 67 g of NORPAR 12, 7 g of Pigment Red 81 (C.I. 45160; #221-0021, Sun Chemical Company, Cincinnati, Ohio) and 0.58 g of 6.16% Zirconium HEX-CEM solution (OMG Chemical Company, Cleveland, Ohio) in an eight ounce glass jar. This mixture was then milled in a 0.5 liter vertical bead mill (Model 6TSG-1/4, Aimex Co., Ltd., Tokyo, Japan) charged with 390 g of 1.3 mm diameter Potters glass beads (Potters Industries, Inc., Parsippany, N.J.). The mill was operated at 2,000 RPM for 1.5 hours without cooling water circulating through the cooling jacket of the milling chamber.

A portion of this 12% (w/w) solids toner concentrate was diluted to approximately 1.0% (w/w). This dilute toner sample exhibited the following properties as determined using the test methods described above:

Number Mean Particle Size: 0.54 micron

Bulk Conductivity: 197.6 picoMhos/cm

Percent Free Phase Conductivity: 11%

Dynamic Mobility: 0.0146 micron-cm/[Volt-second]

Zeta Potential: 30.1 mV

This working strength toner was tested on the toner plating apparatus described previously. The reflection optical density (ROD) was greater than 1.25 at plating voltages greater than 400 volts.

Example 19

Comparative

This is an example of preparing a tacky black liquid toner at an organosol/pigment ratio of 4 using the tacky organosol prepared at core/shell of 4 in Example 7. Approximately 247 g of the organosol@11.68% (w/w) solids in NORPAR 12 were combined with 44 g of NORPAR 12, 7 g of Regal 300R carbon black (Cabot Corp., Billerica, Mass.) and 2.34 g of 6.16% Zirconium HEX-CEM solution (OMG Chemical Company, Cleveland, Ohio) in an eight ounce glass jar. This mixture was then milled in a 0.5 liter vertical bead mill (Model 6TSG-1/4, Aimex Co., Ltd., Tokyo, Japan) charged with 390 g of 1.3 mm diameter Potters glass beads (Potters Industries, Inc., Parsippany, N.J.). The mill was operated at 2,000 RPM for 1.5 hours without cooling water circulating through the cooling jacket of the milling chamber.

A portion of this 12% (w/w) solids toner concentrate was diluted to approximately 1.0% (w/w). This dilute toner sample exhibited the following properties as determined using the test methods described above:

Number mean particle size: 0.31 micron

Bulk conductivity: 269 picoMhos/cm

Percent free phase conductivity: 39%

Dynamic mobility: 0.0223 micron-cm/[volt-second]

Zeta potential: 45.9 mv

This working strength toner was tested on the toner plating apparatus described previously. The reflection optical density (ROD) was greater than 1.25 at plating voltage greater than 450 volts.

What is claimed:

1. An electrophotographic or electrographic liquid toner comprising:

(a) a carrier liquid having a Kauri-butanol number less than 30;

(b) a charge director; and (c) an organosol comprising (i) a (co)polymeric steric stabilizer having a weight-average molecular weight between 50,000 and 1,000,000 Daltons and a polydispersity less than 15, said steric stabilizer being covalently bonded to a thermoplastic (co)polymeric core that is insoluble in said carrier liquid, wherein the weight ratio of said (co)polymeric steric stabilizer to said thermoplastic (co)polymeric core is between 1/1 and 1/15, and said (co)polymeric steric stabilizer comprises a crystallizing polymeric moiety that independently and reversibly crystallizes at or above 22° C.

2. The liquid toner of claim 1 wherein said steric stabilizer is covalently bonded to said thermoplastic (co)polymeric core using an ethylenically unsaturated aliphatic isocyanate.

3. The liquid toner of claim 2 wherein said ethylenically unsaturated aliphatic isocyanate is selected from the group consisting of meta-isopropenyldimethylbenzyl isocyanate and isocyanatoethyl methacrylate.

4. The liquid toner of claim 1 wherein said toner further comprises at least one colorant.

5. The liquid toner of claim 1 wherein said thermoplastic (co)polymeric core has a glass transition temperature less than 25° C.

6. The liquid toner of claim 1 wherein said crystallizing polymeric moiety is a polymeric side-chain covalently bonded to said (co)polymeric steric stabilizer.

7. The liquid toner of claim 1 wherein said crystallizing polymeric moiety is a polymeric unit within the polymeric main-chain of said (co)polymeric steric stabilizer.

8. The liquid toner of claim 1 wherein said toner further comprises a visual enhancement additive.

9. The liquid toner of claim 4 wherein said thermoplastic (co)polymeric core has a glass transition temperature less than 25° C.

10. The liquid toner of claim 4 wherein said crystallizing polymeric moiety is a polymeric side-chain covalently bonded to said (co)polymeric steric stabilizer.

11. The liquid toner of claim 4 wherein said crystallizing polymeric moiety is a polymeric unit within the polymeric main-chain of said (co)polymeric steric stabilizer.

12. The liquid toner of claim 4 wherein said toner further comprises a visual enhancement additive.

13. A process for forming an image on a final receptor comprising the steps of:
   (a) providing a photoreceptive element having an electrostatic charge on the surface thereof,
   (b) exposing said surface with a radiation source to discharge portions of said surface to produce a latent image,
   (c) applying the electrophotographic liquid color toner of claim 1 to said latent image on said surface of said photoreceptive element to form a toned image,
   (d) optionally transferring said toned image onto a transfer medium; and
   (e) transferring said toned image to a final receptor.

14. An electrostatic liquid toner comprising:
   (a) a carrier liquid having a Kauri-butanol number less than 30;
   (b) a charge director; and
   (c) an organosol comprising
      (i) a (co)polymeric steric stabilizer having a weight-average molecular weight between 50,000 and 1,000,000 Daltons and a polydispersity less than 15, said steric stabilizer being covalently bonded to a thermoplastic (co)polymeric core that is insoluble in said carrier liquid, wherein the weight ratio of said (co)polymeric steric stabilizer to said thermoplastic (co)polymeric core is between 1/1 and 1/15, and said (co)polymeric steric stabilizer comprises a crystallizing polymeric moiety this independently and reversibly crystallizes at or above 22° C.

15. The liquid electrostatic toner of claim 14 wherein said steric stabilizer is covalently bonded to said thermoplastic (co)polymeric core using an ethylenically unsaturated aliphatic isocyanate.

16. The liquid electrostatic toner of claim 15 wherein said ethylenically unsaturated aliphatic isocyanate is selected from the group consisting of meta-isopropenyldimethylbenzyl isocyanate and isocyanatoethyl methacrylate.

17. The liquid electrostatic toner of claim 14 wherein said toner further comprises at least one colorant.

18. The liquid electrostatic toner of claim 14 wherein said toner further comprises a visual enhancement additive.

19. The liquid electrostatic toner of claim 14 wherein said thermoplastic (co)polymeric core has a glass transition temperature between 15° C. and 45° C.

20. The liquid electrostatic toner of claim 14 wherein said crystallizing polymeric moiety is a polymeric side-chain covalently bonded to said (co)polymeric steric stabilizer.

21. The liquid electrostatic toner of claim 14 wherein said crystallizing polymeric moiety is a polymeric unit within the polymeric main-chain of said (co)polymeric steric stabilizer.

22. The liquid electrostatic toner of claim 17 wherein said thermoplastic (co)polymeric core has a glass transition temperature between 15° C. and 45° C.

23. The liquid electrostatic toner of claim 17 wherein said crystallizing polymeric moiety is a polymeric side-chain covalently bonded to said (co)polymeric steric stabilizer.

24. The liquid electrostatic toner of claim 17 wherein said crystallizing polymeric moiety is a polymeric unit within the polymeric main-chain of said (co)polymeric steric stabilizer.

25. The liquid electrostatic toner of claim 17 wherein said toner further comprises a visual enhancement additive.

26. A process for forming an image on a receptor comprising the steps of:
   (a) providing a dielectric element,
   (b) applying an electrostatic charge in an imagewise pattern on a surface of said dielectric element to produce a latent image,
   (c) applying the electrographic liquid electrostatic toner of claim 10 to said latent image on said surface of said dielectric element to form a toned image,
   (d) optionally transferring said toned image to a final receptor.

* * * * *